(12) United States Patent
Condon et al.

(10) Patent No.: US 11,541,948 B2
(45) Date of Patent: *Jan. 3, 2023

(54) TRUCK-MOUNTABLE CARGO RACK

(71) Applicant: Yakima Products, Inc., Lake Oswego, OR (US)

(72) Inventors: David Condon, Beaverton, OR (US); Ashley Hoch, Portland, OR (US); Warren E. Stoneburner, Scottsdale, AZ (US)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,364

(22) Filed: Sep. 30, 2021

(65) Prior Publication Data
US 2022/0017155 A1 Jan. 20, 2022

Related U.S. Application Data

(63) Continuation of application No. 17/385,858, filed on Jul. 26, 2021, which is a continuation of application
(Continued)

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC ............................ B62D 33/0207; B60R 9/06
(Continued)

(56) References Cited

U.S. PATENT DOCUMENTS 2,720,414 A * 10/1955 Hart ...................... B62D 33/08
224/403
4,638,563 A 1/1987 Buniff
(Continued)

FOREIGN PATENT DOCUMENTS

WO 2015028467 A1 3/2015

OTHER PUBLICATIONS

Thule, XSporter Pro 500XT Installation Instructions, 12 pages.
(Continued)

*Primary Examiner* — Nathan J Newhouse
*Assistant Examiner* — Lester L Vanterpool
(74) *Attorney, Agent, or Firm* — Kolisch Hartwell, P.C.

(57) ABSTRACT

A truck rack, including rack components and rack accessories, to support cargo over a bed of a truck, and methods of constructing, assembling, mounting, adjusting, and using the truck rack. An illustrative truck rack comprises a tower and a base. The tower may have a foot and an upper end portion. The upper end portion may be configured to support a crossbar. The base may be configured to mount the tower on an upper wall region of a truck bed. The base may include a deck on which to support the foot and at least one securing device to secure the foot on the deck. In some examples, the at least one securing device may include a clamp configured to engage opposite edge regions of the foot. In some examples, the clamp may be configured to urge the opposite edge regions downward toward the deck.

15 Claims, 21 Drawing Sheets

Related U.S. Application Data

No. 16/428,728, filed on May 31, 2019, now Pat. No. 11,072,376.

(60) Provisional application No. 62/679,481, filed on Jun. 1, 2018, provisional application No. 62/679,579, filed on Jun. 1, 2018.

(58) Field of Classification Search
USPC .......................................................... 446/470
See application file for complete search history.

(56) References Cited

U.S. PATENT DOCUMENTS

| | | | |
|---|---|---|---|
| 5,002,324 A * | 3/1991 | Griffin | B60R 9/00 296/3 |
| 5,037,152 A * | 8/1991 | Hendricks | B60R 9/00 296/26.06 |
| 5,108,141 A | 4/1992 | Anderson | |
| 5,137,320 A * | 8/1992 | Christensen | B60R 9/00 296/3 |
| 5,143,415 A * | 9/1992 | Boudah | B60R 9/00 224/325 |
| 5,186,513 A | 2/1993 | Strother | |
| 5,238,280 A | 8/1993 | Christensen | |
| 5,393,114 A | 2/1995 | Christensen | |
| 5,454,612 A | 10/1995 | Christensen | |
| 5,470,120 A | 11/1995 | Christensen | |
| 5,476,301 A * | 12/1995 | Berkich | B60R 9/00 224/403 |
| 5,494,327 A | 2/1996 | Derecktor | |
| 5,628,540 A * | 5/1997 | James | B60R 9/00 224/403 |
| 5,725,137 A | 3/1998 | Macdonald | |
| D398,284 S | 9/1998 | Carter et al. | |
| 5,927,782 A | 7/1999 | Olms | |
| 6,059,159 A | 5/2000 | Fisher | |
| 6,347,731 B1 * | 2/2002 | Burger | B60R 9/00 224/403 |
| 6,513,849 B2 | 2/2003 | Carter | |
| 6,775,638 B2 | 8/2004 | Gauthier et al. | |
| 6,971,563 B2 | 12/2005 | Levi | |
| 7,014,236 B2 | 3/2006 | Kems | |
| 7,296,836 B1 | 11/2007 | Sabo | |
| 7,296,837 B2 * | 11/2007 | Niedziela | B60R 11/00 296/3 |
| 7,419,075 B2 * | 9/2008 | Green | B60R 9/00 211/206 |
| D582,337 S | 12/2008 | Derecktor | |
| 7,464,977 B1 * | 12/2008 | Price | B60P 3/40 296/26.05 |
| 7,494,169 B2 * | 2/2009 | Collins | B62D 33/0207 296/3 |
| 7,530,614 B2 | 5/2009 | Nichols | |
| 7,641,251 B1 * | 1/2010 | Stepanians | B60P 3/40 296/3 |
| 7,753,425 B2 | 7/2010 | Niedziela et al. | |
| 7,757,916 B1 | 7/2010 | Petrie et al. | |
| 7,758,091 B1 | 7/2010 | McCall | |
| 8,191,744 B2 | 6/2012 | Petrie et al. | |
| 8,322,582 B2 * | 12/2012 | Flaherty | B60R 9/00 224/405 |
| 8,668,125 B2 * | 3/2014 | Williams | B60R 9/06 224/403 |
| 9,150,161 B2 | 10/2015 | Laverack et al. | |
| 9,248,785 B2 * | 2/2016 | Perry | B60R 9/058 |
| 9,566,914 B2 * | 2/2017 | Marr, Jr. | B60R 9/06 |
| 9,725,046 B2 | 8/2017 | Perry | |
| 9,834,258 B2 | 12/2017 | Marr, Jr. | |
| 10,131,287 B1 * | 11/2018 | Marino | B60R 9/045 |
| 10,207,650 B1 * | 2/2019 | Banegas | B60R 9/06 |
| 10,421,385 B2 * | 9/2019 | Chambers | B60R 9/00 |
| 11,072,376 B2 | 7/2021 | Condon et al. | |
| 2003/0204358 A1 | 10/2003 | Gauthier et al. | |
| 2004/0134953 A1 | 7/2004 | Perez | |
| 2004/0211802 A1 * | 10/2004 | Levi | B60R 9/0423 224/405 |
| 2007/0278810 A1 | 12/2007 | Collins | |
| 2008/0100075 A1 * | 5/2008 | Derecktor | B60P 3/40 296/3 |
| 2009/0026784 A1 * | 1/2009 | Green | B60R 9/00 224/403 |
| 2010/0072237 A1 * | 3/2010 | Green | B60R 9/00 296/3 |
| 2010/0288808 A1 | 11/2010 | Marr, Jr. | |
| 2013/0026202 A1 | 1/2013 | Williams | |
| 2013/0229025 A1 * | 9/2013 | Johnasen | B60P 3/00 296/3 |
| 2014/0034693 A1 | 2/2014 | Perry | |
| 2014/0034695 A1 | 2/2014 | Perry | |
| 2014/0034696 A1 * | 2/2014 | Marr | B60R 9/045 224/405 |
| 2014/0305979 A1 | 10/2014 | Marr, Jr. | |
| 2015/0197202 A1 * | 7/2015 | Harrison | B62D 33/02 296/3 |
| 2015/0258940 A1 * | 9/2015 | Breeden, III | B60R 9/045 224/405 |
| 2016/0311377 A1 | 10/2016 | Aftanas et al. | |
| 2017/0113739 A1 | 4/2017 | Marr | |
| 2018/0154817 A1 | 6/2018 | Chambers | |
| 2019/0367101 A1 | 12/2019 | McFadden et al. | |

OTHER PUBLICATIONS

Tracrac, Inc., The Ultimate Sliding Rack, Installation Manual, 12 pages.

U.S. Patent and Trademark Office, Non-Final Office Action regarding U.S. Appl. No. 16/428,780, dated Apr. 16, 2020, 20 pages.

U.S. Patent and Trademark Office, Non-Final Office Action regarding U.S. Appl. No. 16/428,728, dated Apr. 16, 2020, 19 pages.

U.S. Patent and Trademark Office, Final Office Action regarding U.S. Appl. No. 16/428,728, dated Nov. 13, 2020, 19 pages.

China National Intellectual Property Administration, First Office Action for Chinese Patent Application No. 2020102607921, dated Apr. 19, 2022, 16 pages.

China National Intellectual Property Administration, Second Office Action for Chinese Patent Application No. 2020102607921, dated Jul. 8, 2022, 14 pages.

* cited by examiner

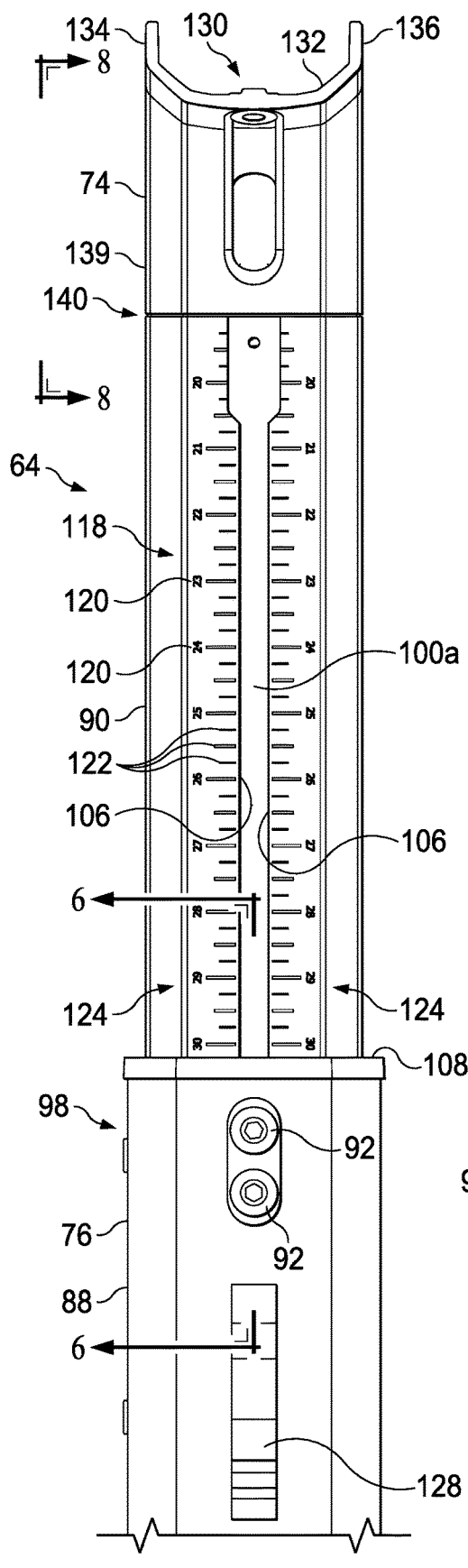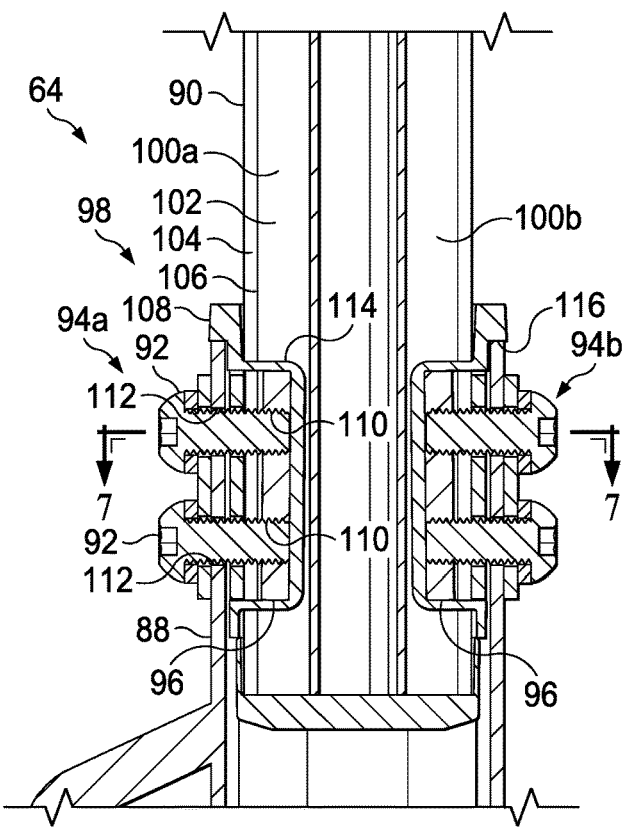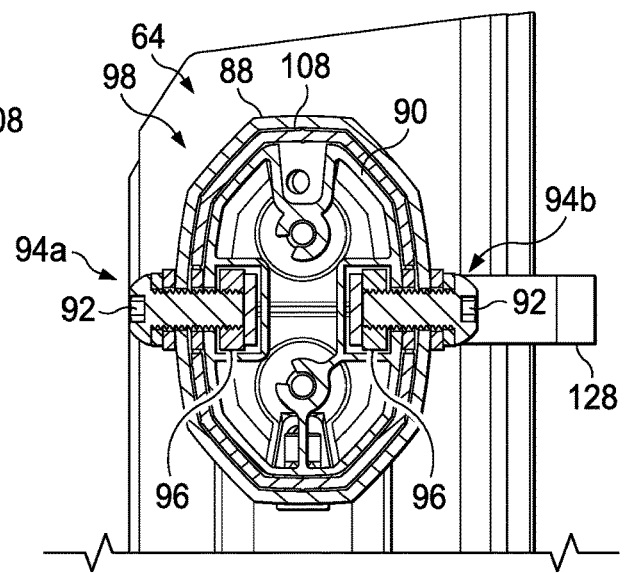
FIG. 5
FIG. 6
FIG. 7

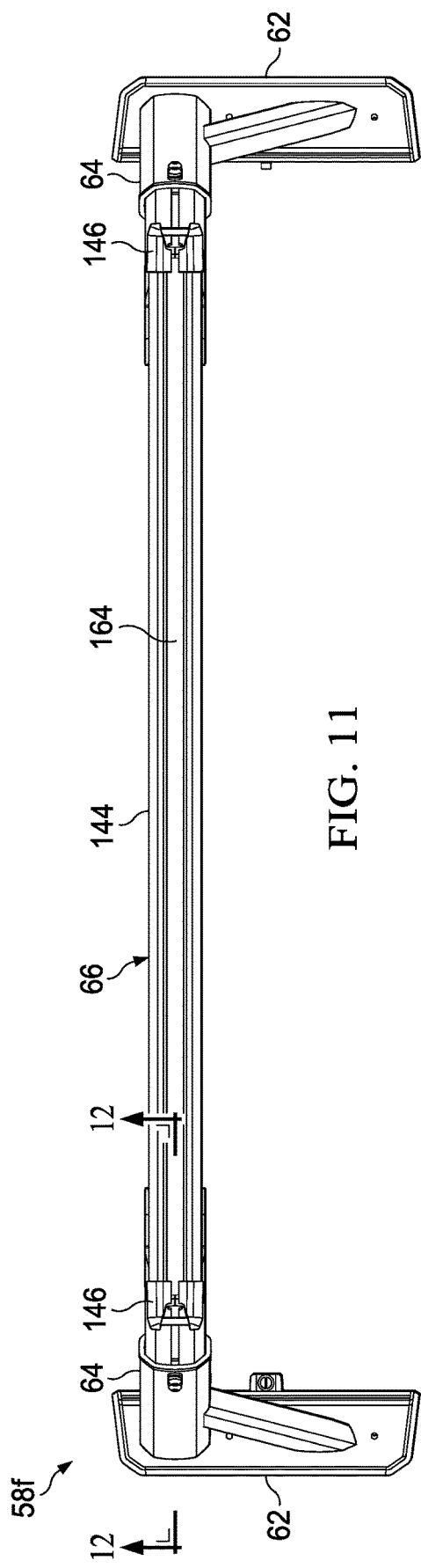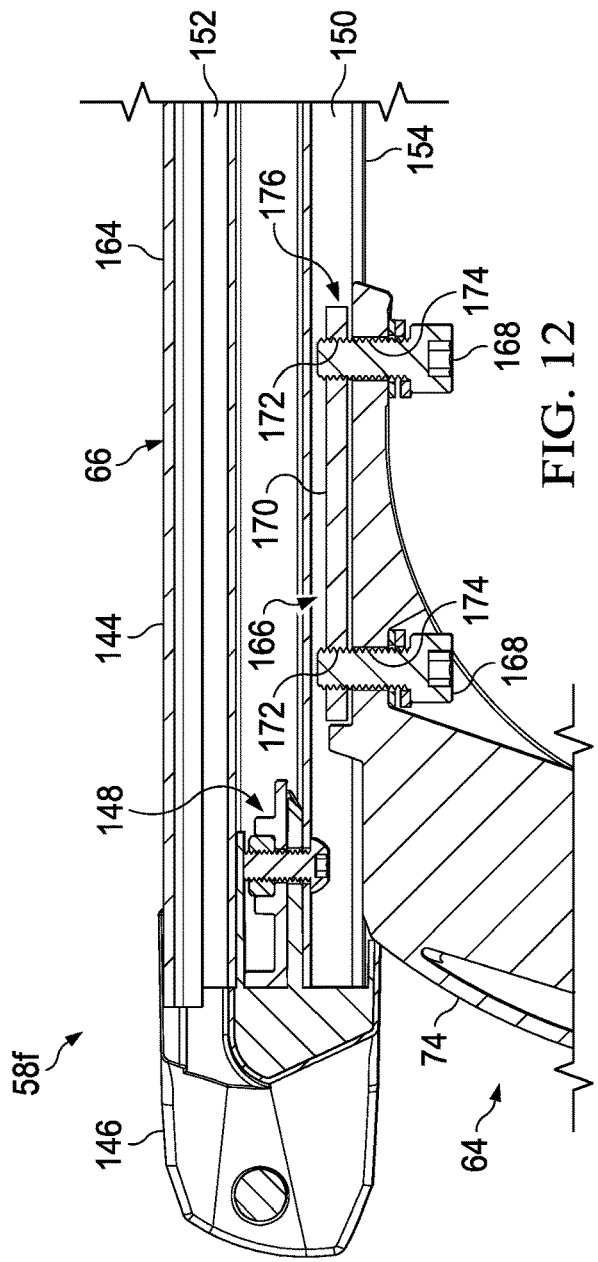

TRUCK-MOUNTABLE CARGO RACK

CROSS-REFERENCES TO PRIORITY APPLICATIONS

This application is a continuation of U.S. patent application Ser. No. 17/385,858 filed Jul. 26, 2021, which is a continuation of U.S. patent application Ser. No. 16/428,728 filed May 31, 2019, which claims priority from U.S. Provisional Patent Application Ser. No. 62/679,481, filed Jun. 1, 2018, and U.S. Provisional Patent Application Ser. No. 62/679,579, filed Jun. 1, 2018. The complete disclosures of each application are hereby incorporated by reference in their entireties for all purposes.

INTRODUCTION

Pickup trucks typically have an open bed surrounded by wall structures for containing and carrying cargo. Often it is desirable to mount a cargo rack over the bed of the truck to secure specific items. One approach is to mount towers and crossbars to opposing side wall structures (bed rails) of the truck's bed.

Sometimes it is desirable to dismount and later remount a truck rack. This can be labor intensive, every time needing to uncouple the rack from the truck, and then later properly align and re-attach the rack to the truck. Reinstalling the rack numerous times also may take a toll on the truck by scratching or denting the truck's contact surfaces.

Furthermore, depending on the type and/or volume of cargo being carried in the truck bed and/or on a truck rack, it may be beneficial to raise or lower the crossbars of the truck rack. Accordingly, the towers supporting each crossbar are typically vertical (i.e., orthogonal to the crossbar) to enable height adjustment of the crossbars. However, vertical towers mounted to bed rails are not aerodynamic because they do not follow the profile of the truck's cab, which creates drag. Instead, vertical towers protrude from the travel envelope of the truck according to the height of the towers, which creates more drag as the height of the towers is increased. It also may be difficult to match the heights of the ends of the crossbars so that the crossbars are each horizontal and at the same elevation as one another.

SUMMARY

The present disclosure provides a truck rack, including rack components and rack accessories, to support cargo over a bed of a truck, and methods of constructing, assembling, mounting, adjusting, and using the truck rack. An illustrative truck rack comprises a tower and a base. The tower may have a foot and an upper end portion. The upper end portion may be configured to support a crossbar. The base may be configured to mount the tower on an upper wall region of a truck bed. The base may include a deck on which to support the foot and at least one securing device to secure the foot on the deck. In some examples, the at least one securing device may include a clamp configured to engage opposite edge regions of the foot. In some examples, the clamp may be configured to urge the opposite edge regions downward toward the deck.

BRIEF DESCRIPTION OF THE DRAWINGS

FIG. 5 is a fragmentary view of an upper region of a tower of the crossbar assembly of FIG. 2, taken generally along line 5-5 of FIG. 2.

FIG. 6 is a sectional view of the tower of FIG. 5, taken generally along line 6-6 of FIG. 5 through an adjustable joint of the tower at which the tower can be changed between height-adjustable and fixed-height configurations.

FIG. 7 is a sectional view of the tower of FIG. 5, taken generally along line 7-7 of FIG. 6 through the adjustable joint of the tower.

FIG. 11 is a top view of the crossbar assembly and bases of FIG. 2, taken with the crossbar attached to the towers.

FIG. 12 is a fragmentary, sectional view of the crossbar assembly of FIG. 11, taken generally along line 12-12 of FIG. 11.

DETAILED DESCRIPTION

Figure 1:
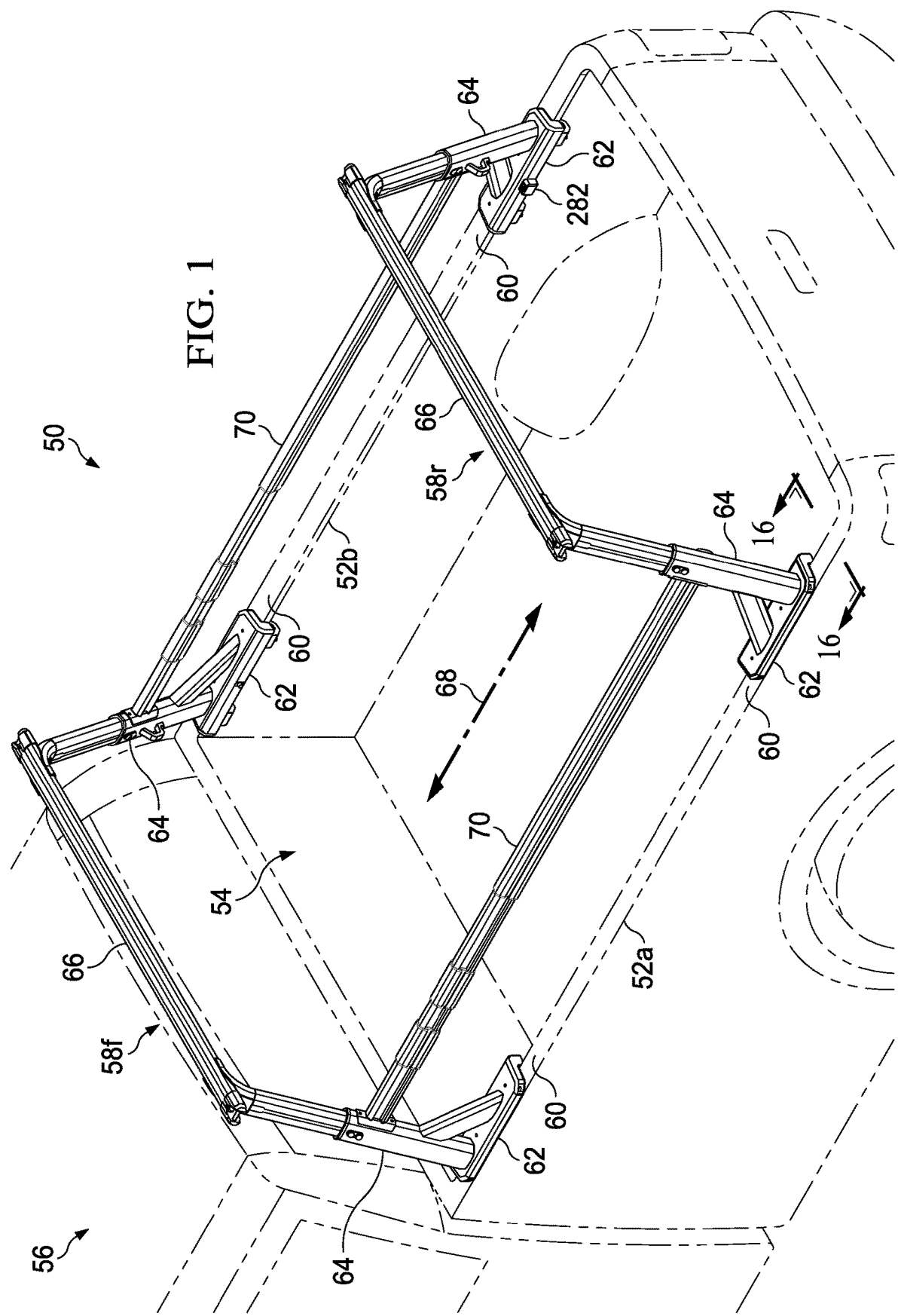
FIG. 1 is an isometric view of an illustrative height-adjustable truck rack mounted on bed rails of a truck, with the truck shown in phantom.

The present disclosure provides a truck rack, including rack components and rack accessories, to support cargo over a bed of a truck, and methods of constructing, assembling, mounting, adjusting, and using the truck rack.

An illustrative truck rack comprises a tower and a base. The tower may have a foot and an upper end portion. The upper end portion may be configured to support a crossbar. The base may be configured to mount the tower on an upper wall region of a truck bed. The base may include a deck on which to support the foot and at least one securing device to secure the foot on the deck. In some examples, the at least one securing device may include a clamp configured to engage opposite edge regions of the foot. In some examples, the clamp may be configured to urge the opposite edge regions downward toward the deck as the clamp is tightened against the opposite edge regions.

The bases of the truck rack may be designed to remain mounted to the bed rails of a truck bed while the crossbar assemblies are uncoupled and removed from the bases, and then later re-mounted again. For example, each base may have a quick-release clamp that secures a corresponding tower to the base. The clamp provides the ability to quickly remove, as a unit, and and then later re-mount, as a unit, each crossbar assembly of the truck rack, while the bases of the truck remain mounted at their same respective positions on the bed rails. Accordingly, the crossbar assemblies of the truck rack can be removed and reinstalled numerous times, to reconfigure the truck bed for different uses, without the need to change any interfaces between the truck and the truck rack, thereby avoiding damage to contact surfaces of the truck.

Each base may include a shoe member to receive the foot of a tower. The shoe member may include an upper portion that sits on top of a horizontal surface of a truck bed rail and a lower portion adjacent, and optionally facing, an inner side surface of the truck bed rail. The base may have one or more coupling members for mounting the base to the bed rail. Each coupling member may, for example, include a slot-engaging member (e.g., a claw, a bolt member, or a nut member) connected to the shoe member by at least one fastener. The slot-engaging member may be configured, in various examples, to engage a slot that is open at the bottom, open at the top, or opening along a side intermediate the bottom and top of the slot.

The shoe member of a base may include a clamp having a fixed jaw (also called a fixed cleat) and a movable cleat (also called a movable cleat). The fixed jaw may be an outboard fixed jaw (i.e., relatively farther from a center plane of the truck), and the movable jaw may be an inboard fixed jaw (i.e., relatively closer to the center plane). The foot of a tower can be secured to the shoe member by (1) hooking an edge region and/or a flange of the foot under the fixed jaw, and (2) manipulating a clamp actuator that causes the movable jaw to rotate about a longitudinal axis. As the movable jaw rotates toward the fixed jaw, angled surfaces on the foot and one or both jaws may interact to create a tight joint that holds the foot in place on the shoe member.

Another illustrative truck rack comprises a crossbar and a pair of towers. Each tower may include a lower end portion configured to be mounted on an upper wall region of a truck bed, an upper end portion configured to support a crossbar, and a telescoping intermediate portion configured to extend upward with an inward slope and an adjustable length. The crossbar and tower may be designed to allow for quick adjustment of crossbar height in relation to a truck's bed rails. Unlike other truck racks, the towers may be continuously adjustable to a very precise height, as opposed to being limited to incremental steps. Furthermore, telescoping adjustment of the intermediate portion may be completed above the truck's bed rails without intruding on the interior space of the truck bed.

Height adjustment of a crossbar may be performed while the crossbar is connected as part of a crossbar assembly to a pair of truck-mounted bases via a pair of telescoping towers. Each telescoping tower may be connected to the crossbar at a tower-crossbar joint such that a linear axis of the tower is oblique to the crossbar. To adjust the height of a crossbar assembly, a user loosens each tower-crossbar joint and a telescoping joint of each tower and then raises or lowers the crossbar, which causes each tower-crossbar joint to travel along the crossbar. Height-indicating indicia may be laser etched/printed on the towers, and/or position-indicating (centering) indicia may be laser etched/printed on the crossbar to help a user level and center the crossbar.

Yet another illustrative truck rack comprises first and second crossbar assemblies each including a crossbar and a pair of towers. The truck rack also may comprise a side rail configured to extend between corresponding towers of the crossbar assemblies, and a rack accessory configured to be mounted to the side rail via a slot (e.g., an axial slot, which may be a T slot). The side rail may have an adjustable length, which allows a user to choose the distance between the crossbars. The side rail may include a telescoping bar having an outer tube and an inner tube at least partially nested in the outer tube and slidably extendable therefrom. The outer and inner tubes may be extrusions. One or more sleeves may be disposed around the inner tube. Each sleeve may include a slot for attachment of a rack accessory. The sleeve may have substantially the same cross-sectional shape as the outer tube. The sleeve may be slidable along the inner tube and fixable, to provide an adjustably positionable anchor point for the rack accessory.

Further aspects of the present disclosure are described in the following sections: (I) illustrative truck rack, (II) exemplary bases of a truck rack, (III) illustrative side rail, and (IV) examples.

I. ILLUSTRATIVE TRUCK RACK

This section provides an overview of an illustrative truck rack 50 of the present disclosure; see FIGS. 1-12, 13A, and 13B.

FIG. 1 shows an exemplary cargo rack, truck rack 50, mounted on left and right bed rails 52*a*, 52*b* of a bed 54 of a pickup truck 56. Truck rack 50 includes front and rear crossbar assemblies 58*f*, 58*r* each mounted on upper wall regions 60 of bed rails 52*a*, 52*b* via a pair of bases 62 (for a total of four bases 62). Each crossbar assembly 58*f*, 58*r* may have a pair of towers 64 mounted on bed rails 52*a*, 52*b* via bases 62, and a crossbar 66 supported by and connected to the pair of towers 64. Each crossbar assembly 58*f*, 58*r* may be mounted such that a plane defined by the crossbar assembly is orthogonal to a longitudinal axis 68 of truck 56. The crossbar assemblies may be substantially identical to one another, as depicted here, which is more apparent if one of the crossbar assemblies is rotated 180 degrees about a vertical axis. Accordingly, the crossbar assemblies may be interchangeable with one another (e.g., when rotated 180 degrees).

Each crossbar 66 may have any suitable structure. The crossbar may be elongated sufficiently to span the distance between a pair of towers. The crossbar may have any suitable cross-sectional shape including round, oval, rectangular, or the like.

One or more side rails 70 may connect crossbar assemblies 58*f*, 58*r* to one another above truck bed 54. For example, illustrative truck rack 50 shown here has left and right side rails 70 each extending between and attached to a pair of left towers 64 or a pair of right towers 64. Each side rail 70 may be arranged to be substantially horizontal, substantially parallel to longitudinal axis 68 of truck 56, and/or substantially orthogonal to the plane defined by each crossbar assembly 58*f*, 58*r*. Side rails 70 add functionality to truck rack 50, as described further below, but may be an optional accessory.

Figure 2:
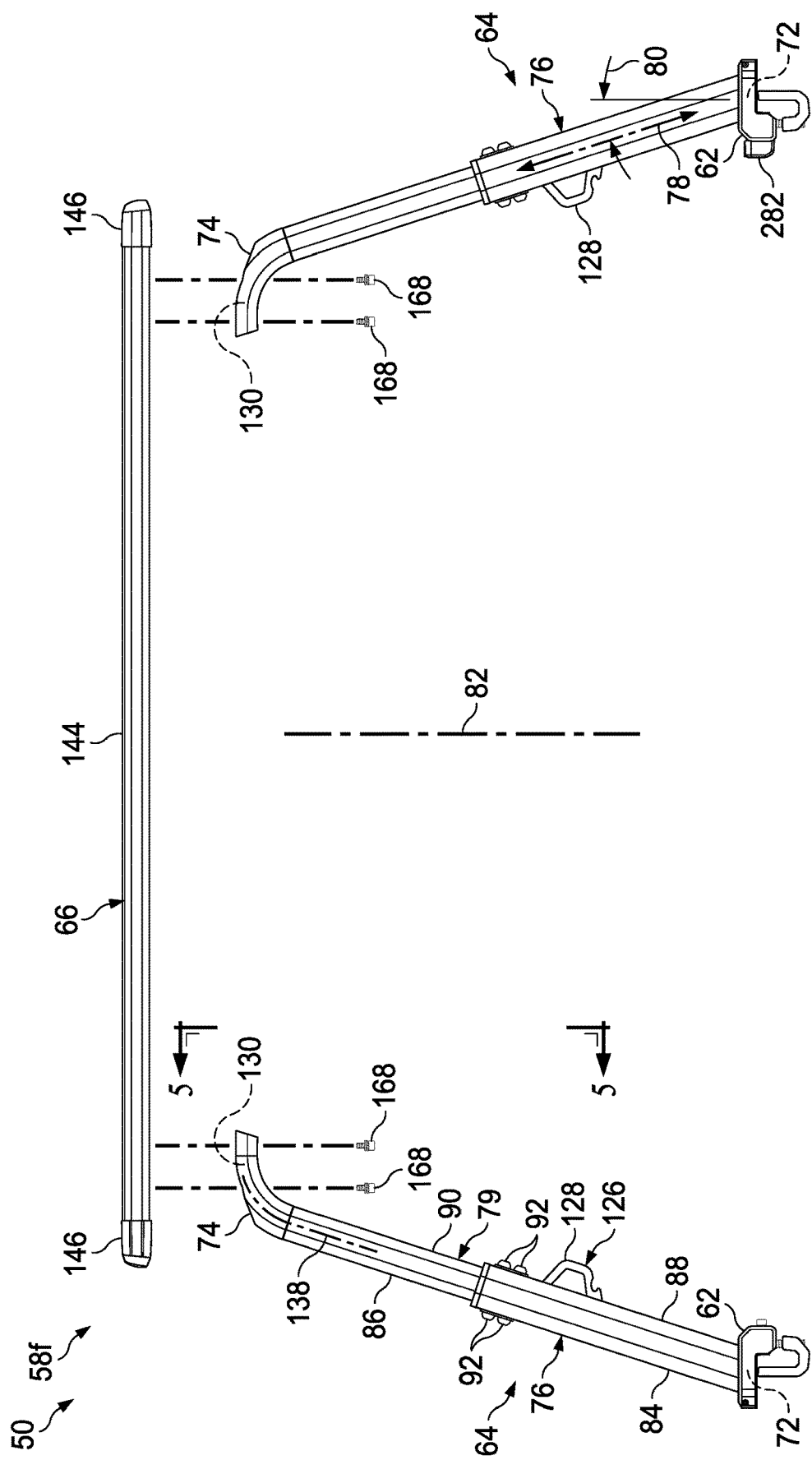
FIG. 2 is an exploded front view of the front crossbar assembly of the truck rack of FIG. 1 attached to a pair of bases.

FIG. 2 shows crossbar assembly 58*f* in an exploded configuration, but with both towers 64 still mounted to respective bases 62. Each tower 64 may have a lower end portion 72, an upper end portion 74, and an intermediate portion 76 extending from lower end portion 72 to upper end portion 74. Intermediate portion 76 may be elongated and substantially linear to define a linear axis 78 (see the right side of FIG. 2). The intermediate portion may include or be a shaft 79 (interchangeably described as a leg) that extends between portions 72, 74 (see the left side of FIG. 2). An angle 80 may be formed between linear axis 78 and an intersecting vertical axis, such that tower 64 slopes inward toward a central plane 82 of the truck. (Central plane includes truck longitudinal axis 68 (see FIG. 1), is vertical, and conceptually divides the truck into left and right halves.) The slope of tower 64 (i.e., the value of angle 80) may be about 5-40, 10-30, or 15-25 degrees from vertical, among others. The slope may generally match the profile of the truck's cab, to make each tower more aerodynamic.

Each tower 64 may have an adjustable height/length to change the height of crossbar 66 above the truck bed (see FIGS. 2-7). For example, the tower may include a lower section 84 and an upper section 86 having a telescoping arrangement in which one of the sections is at least partially nestable in the other section and is slidably extendable therefrom (see FIG. 2). In the depicted example, sections 84, 86 include an outer tube 88 and an inner tube 90, and the inner tube telescopes from the outer tube. Tower 64 is adjustable between an adjustable-height configuration (i.e., where upper section 86 is extendable/retractable to change the tower length and height) and a fixed-height configuration (i.e., where sections 84, 86 are not axially slidable relative to one another). For example, one or more fasteners 92 may be manipulated to change each tower 64 between these two configurations (see the left side of FIG. 2). In the depicted example, each tower 64 includes a pair of fastener assemblies 94*a*, 94*b* located on inner and/or outer sides of tower 64 (i.e., respectively closer to and farther from central plane 82) (see FIGS. 2, 6, and 7). Each fastener assembly 94*a*, 94*b* may include one or more externally-threaded fasteners 92 (i.e., bolt members) that engage at least one internally threaded fastener 96 (i.e., a nut member(s)) (see FIGS. 6 and 7). In other examples, each fastener assembly 94*a*, 94*b* may be located on only one side of tower 64 and/or may include only one fastener 92.

Each fastener assembly 94*a*, 94*b* may be adjustable to apply compression between aligned wall regions of outer tube 88 and inner tube 90 at a joint 98 (see FIGS. 5-7). More specifically, inner tube 90 may have one or more axial slots 100*a*, 100*b* to receive one or more internally-threaded fasteners 96. Each axial slot 100*a*, 100*b* may have a wider channel 102 adjoining and inward of a narrower throat 104 (see FIG. 6). (Also see the related discussion of crossbar slots for FIG. 13B.) For example, each axial slot 100*a*, 100*b* may be a T slot in which throat 104 is formed by a pair of longitudinal lips 106 at the lateral periphery of the T slot, or the throat may be formed by only one longitudinal lip 106, among others (see FIGS. 5 and 6). (Each lip 106 interchangeably may be termed a flange.) Tightening each fastener assembly 94*a*, 94*b* may compress one or more lips 106 of one of slots 100*a*, 100*b* and an overlying wall region of outer tube 88 toward one another, to prevent outer and inner tubes 88, 90 from sliding axially relative to one another at joint 98. In some examples, inner tube 90 may have only one axial slot 100*a* or 100*b* that is used to receive one or more internally-threaded fasteners 96. In some examples, the positions of fasteners 92, 96 may be switched, with fastener 92 having a head in one of slots 100*a*, 100*b*, and a shaft extending through throat 104 of the slot, and with fastener 96 (e.g., a nut member having a single aperture) located outside the slot.

A bushing 108 may be located at joint 98. During assembly of tower 64, bushing 108 may be used to coaxially align each fastener aperture 110 of each internally-threaded fastener 96 with a corresponding outer-tube aperture 112 of outer tube 88. Bushing 108 may have a respective fastener-holding region 114 to receive each fastener 96 before the bushing is inserted into an end region of outer tube 88. A shoulder 116 of bushing 108 may stop advancement of the bushing into outer tube 88 when fastener apertures 110 are aligned with outer-tube apertures 112. Then, inner tube 90 can be inserted into outer tube 88, such that each fastener-holding region 114 of bushing 108, and fastener 96 held therein, enters channel 102 of axial slot 100a or 100b from a longitudinal end thereof. The leading end of each externally-threaded fastener 92 then can be passed through an outer-tube aperture 112 and into a fastener aperture 110 located in channel 102, via throat 104 of one of axial slots 100a, 100b.

Bushing 108 may be advantageous for several reasons. First, the bushing creates a better fit between tubes 88, 90, such that the tubes slide more smoothly relative to one another, with less lateral play. Second, the bushing may be formed of a softer and/or more slippery material (e.g., polymer) than outer and inner tubes 88, 90 (e.g., metal, such as an aluminum alloy). Accordingly, the composition of the bushing may facilitate sliding and may reduce scratching of tubes 88, 90, which may otherwise remove a coating (e.g., paint) therefrom. Third, as explained above, the bushing aligns apertures 110, 112 for receiving fasteners 92, which may be challenging otherwise.

Each tower 64 may have height-indicating indicia 118 configured to match heights of towers 64 (see FIG. 5). Indicia 118 may be formed on inner tube 90 and/or upper section 86 of the tower (also see FIG. 2). Indicia 118 may include a series of numbers 120 and reference marks 122, which may form an indicia set 124. In the depicted example, inner tube 90 has a pair of indicia sets 124 arranged along edges of inner axial slot 100a.

A loop 126 may be formed on each tower 64 by a bracket 128 (see FIGS. 2, 5, and 7). The bracket may be attached to intermediate portion 76, such as on a side of outer tube 88 of lower section 84.

Upper end portion 74 may form a saddle 130 to receive a portion of crossbar 66 (see FIGS. 2, 5, and 8-10). Saddle 130 may be arranged substantially horizontally. The saddle may be formed by a recess 132 defined by a top side of upper end portion 74, which creates a pair of walls 134, 136 that are spaced from one another along a line parallel to longitudinal axis 68 of the truck, to restrict transverse horizontal motion of one end of crossbar 66. However, saddle 130 may permit crossbar 66 to slide longitudinally (parallel to the crossbar's long axis) until the crossbar is firmly attached to the saddle.

Tower 64 may extend along an at least partially curved longitudinal axis 138 between top and bottom ends thereof (see FIG. 2). More specifically, tower 64 may extend upward linearly from lower end portion 72, with a slope as already discussed, and then may smoothly curve inward along upper end portion 74 to a substantially horizontal orientation (see FIGS. 2 and 8). In some examples, upper end portion 74 may be provided by a discrete end component 139 that attaches end-to-end with intermediate portion 76 to form a joint 140 (see FIGS. 8 and 9). For example, end component 139 and inner tube 90 of intermediate portion 76 may mate with one another axially, to insert an insertable region 141 of end component 139 into a correspondingly shaped opening(s) of inner tube 90 (and/or vice versa). This mating may restrict transverse motion of intermediate portion 76 and end component 139 relative to one another. Intermediate portion 76 and end component 139 may be secured to one another axially with one or more fasteners 142 (e.g., bolts) (see FIGS. 8 and 10). The cross-sectional dimensions of the upper end of intermediate portion 76 (e.g., provided by inner tube 90) may match those of the lower end of end component 139 adjacent insertable region 141, such that portions 74, 76 are predominantly flush with one another around joint 140, to provide a smooth transition from intermediate portion 76 to upper end portion 74. The partially linear, partially curved configuration of tower 64 makes the tower more aerodynamic, because saddle 130 extends inward but does not project outward from a shaft of the tower, in a direction away from central plane 82 (also see FIG. 2).

Crossbar 66 may include a tube 144, and a pair of end caps 146 attached to opposite ends of the tube via respective fastener assemblies 148 (see FIGS. 2, 11, 12, 13A, and 13B). Tube 144 may have a substantially uniform cross-sectional shape along its length (see FIG. 13B). The tube may, for example, be formed by extrusion and/or may be composed of a metal alloy, such as an aluminum alloy.

Figure 13A:
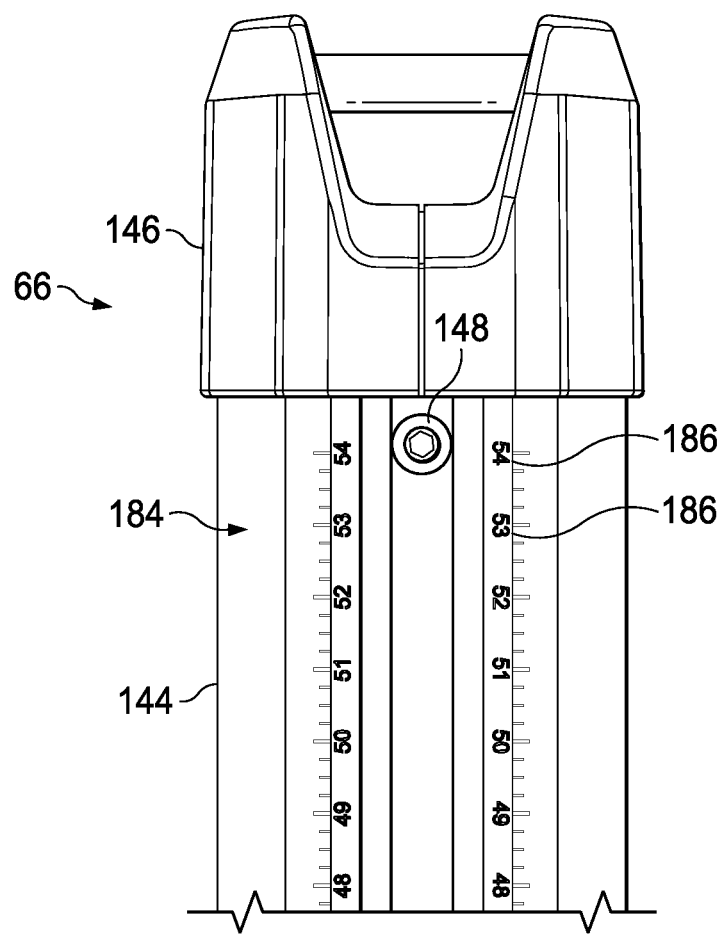
FIG. 13A is a fragmentary bottom view of an end portion of a crossbar of the crossbar assembly of FIG. 12.
Figure 13B:
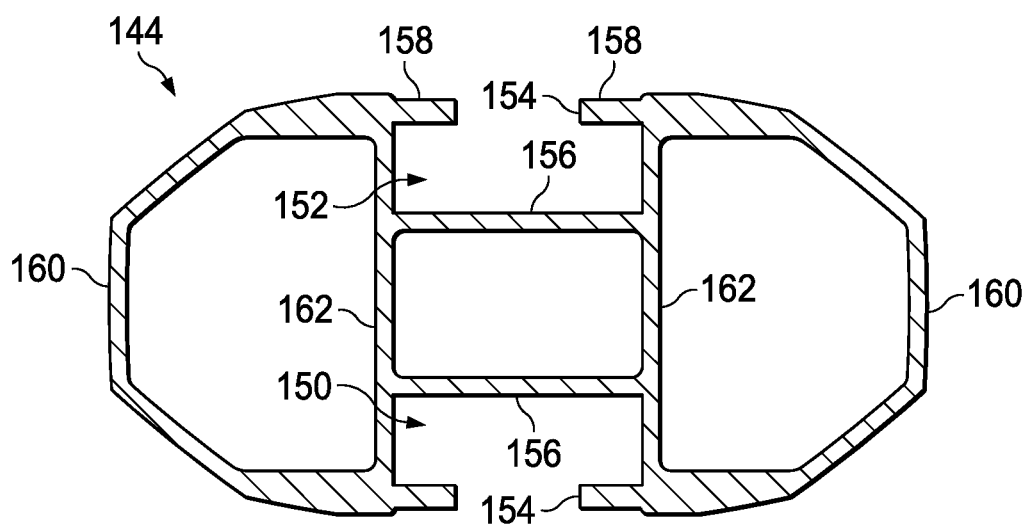
FIG. 13B is a cross-sectional view of a tube that forms an elongated body of the crossbar of FIG. 13A.

Tube 144 may define a lower slot 150 and an upper slot 152 each extending axially along the length of the tube (see FIG. 13B). Each slot 150, 152 may be a T slot, as depicted. Accordingly, each slot 150, 152 may be open along one side to form a throat 154 adjacent a channel 156, where throat 154 is narrower than channel 156 and located outward of channel 156, such as at a periphery of tube 144. Throat 154 may be defined by a pair of lips 158 (interchangeably termed flanges), which may bound a portion of channel 156 and may project at least generally toward one another.

Slots 150, 152 may be connected to one another via any suitable wall structures. For example, slots 150, 152 may be connected to one another via perimeter (outer) walls 160 of tube 144. The slots also may be connected to one another via one or more transverse (inner) walls 162. Transverse walls 162 increase the strength of tube 144 for supporting heavy loads, but may not be required, particularly in other slotted tubes disclosed herein for towers 64 and side rails 70.

Each slot 150, 152 provides a continuous range of potential attachment sites along its length (and thus along crossbar 66). Lower slot 150 may be utilized to attach crossbar 66 to tower 64, and upper slot 152 may be utilized to attach rack accessories, which may or may not be cargo-specific. Exemplary rack accessories are described below in Section III. Upper slot 152 may be occupied by one or more removable infill strip 164 at positions where no rack accessory is attached, as depicted in FIGS. 11 and 12.

Each crossbar 66 may be attached to a pair of towers 64 using at least a pair of crossbar-attaching fastener assemblies 166 (see FIG. 12). Each fastener assembly 166 may include at least one externally-threaded fastener 168 (e.g., a bolt member) and an internally-threaded fastener 170 (e.g., a nut member) having at least one internally-threaded aperture 172. Internally-threaded fastener 170 may be placed into lower slot 150 from an end thereof, and then may slide along lower slot 150 until each internally-threaded aperture 172 is coaxially aligned with holes 174 defined by saddle 130 of upper end portion 74 (see FIGS. 2, 9, 10, and 12). The leading ends of externally-threaded fasteners 168 then may be passed through holes 174 and throat 154 of lower slot 150 and into threaded engagement with internally-threaded apertures 172 to create a tower-crossbar joint 176. Crossbar 66 and tower 64 are slidably connected to another to permit travel relative to one another along lower slot 150, before fastener assembly 166 is tightened, and are locked to another after the fastener assembly is tightened. In other examples, the positions of fasteners 168, 170 may be switched, for example, with fastener 168 having a head in lower slot 150, and with each fastener 170 being a single-aperture nut located under lower slot 150.

Figure 3:
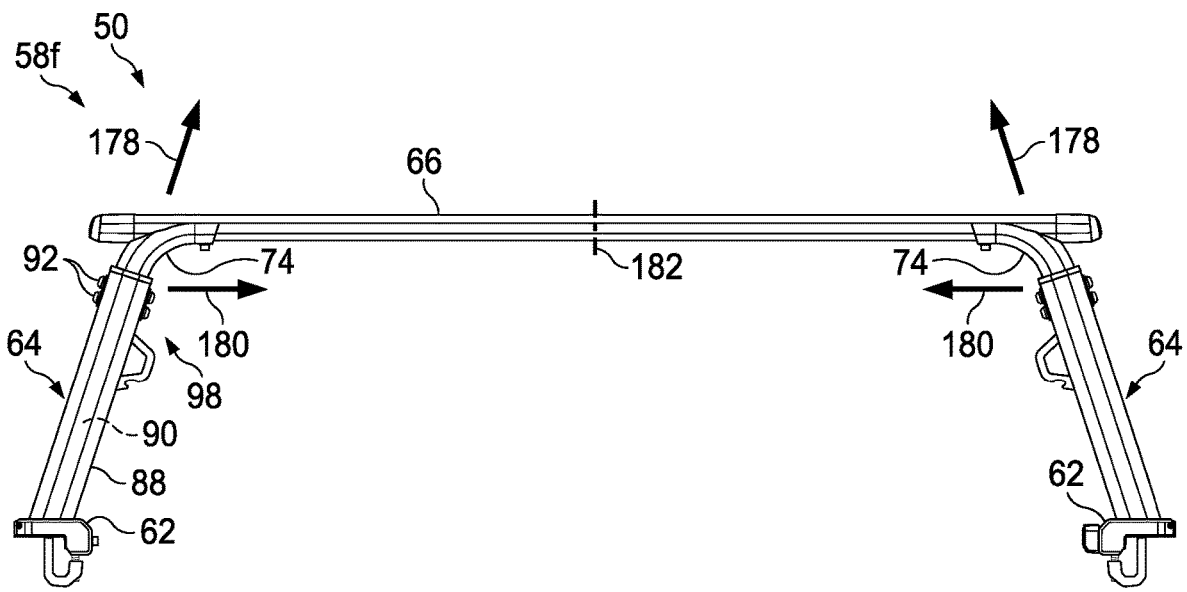
FIGS. 3 and 4 are front views of the crossbar assembly and bases of FIG. 2 illustrating height adjustment of the truck rack via towers thereof, without changing the distance between the bases (e.g., while the bases remain firmly attached to the bed rails of a truck).
Figure 4:
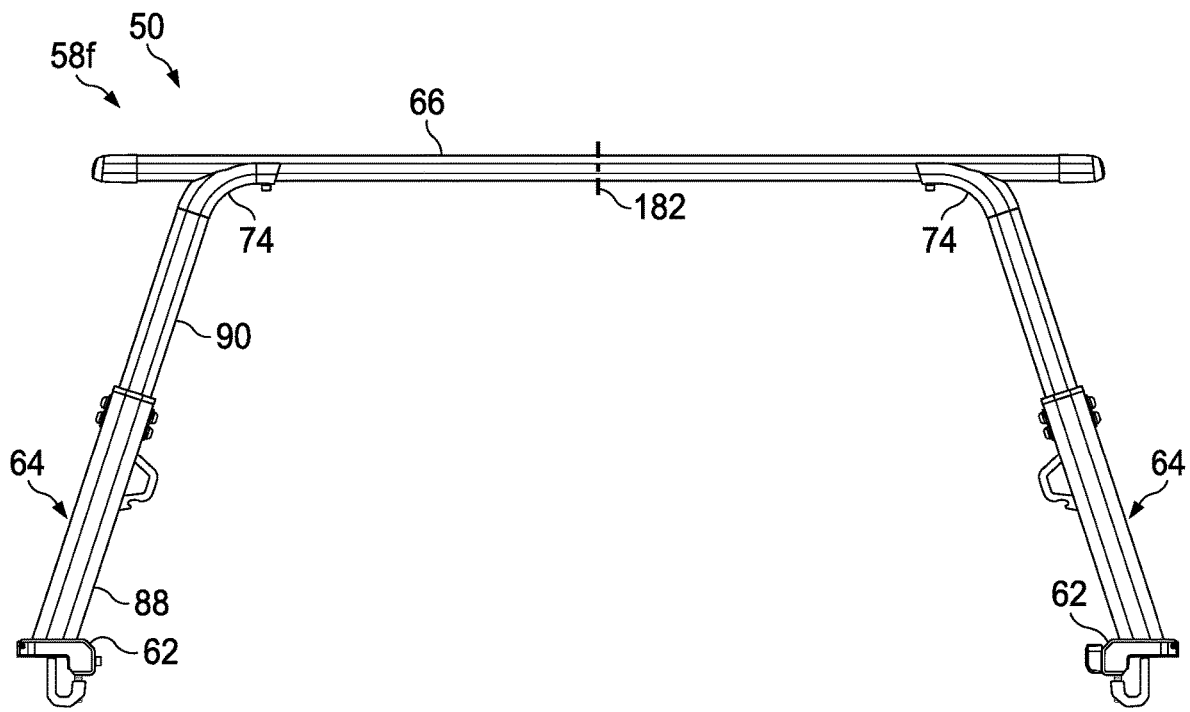
Figure 8:
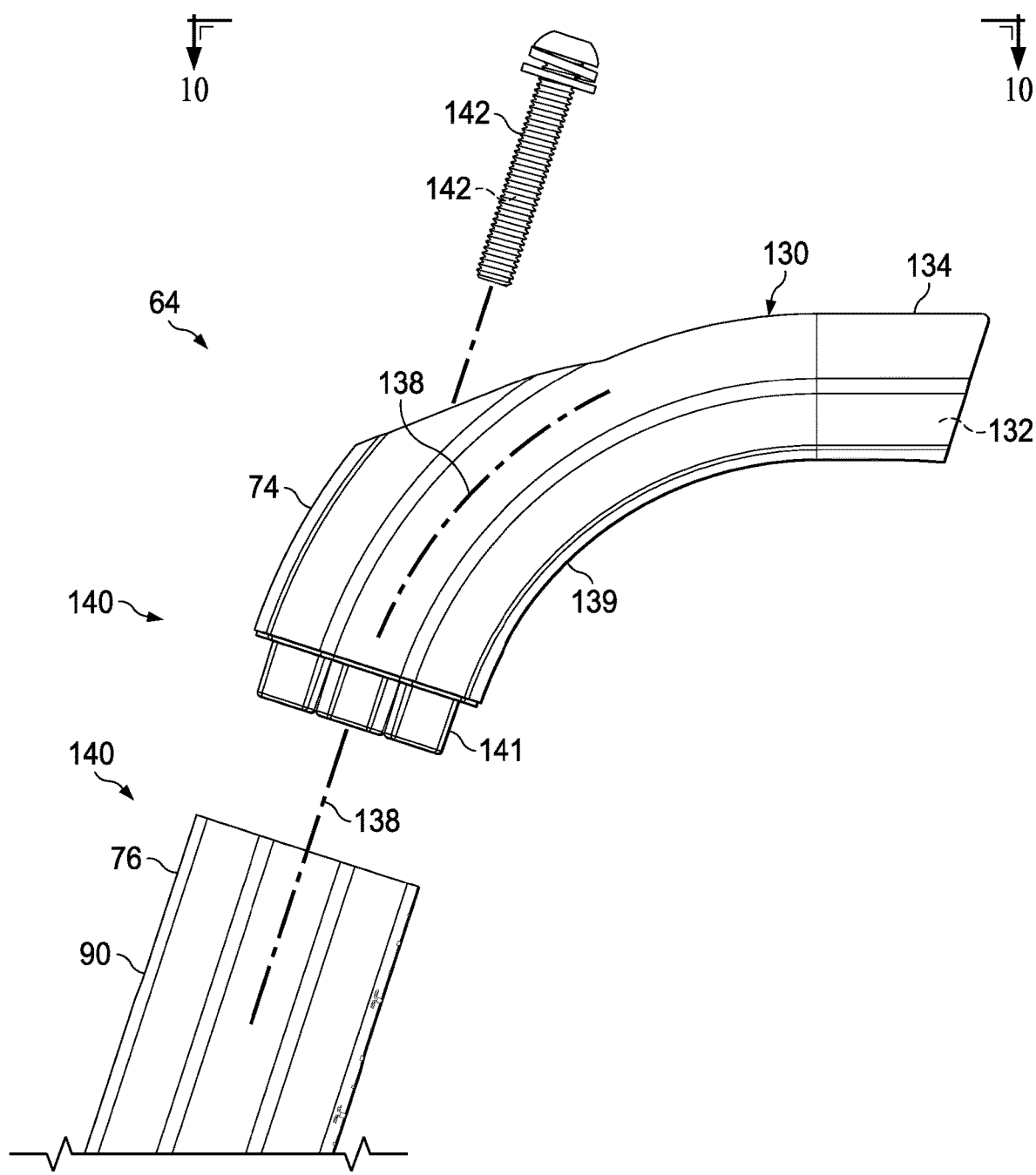
FIG. 8 is a fragmentary, exploded view of an upper end region of the tower of FIG. 5, taken generally along line 8-8 of FIG. 5.
Figure 9:
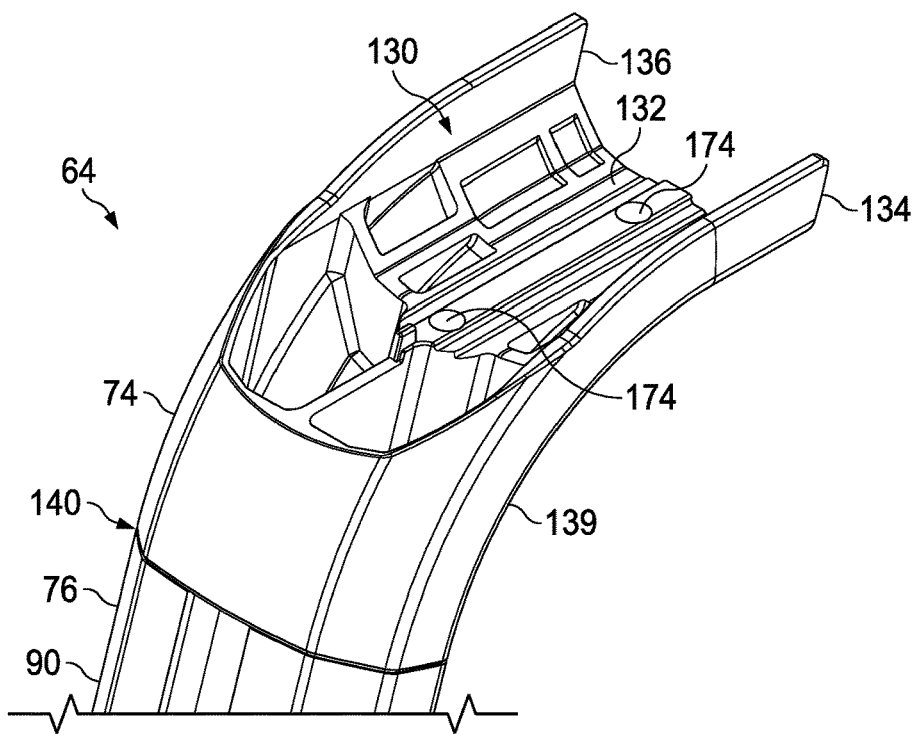
FIG. 9 another fragmentary view of the upper end region of the tower of FIG. 5.
Figure 10:
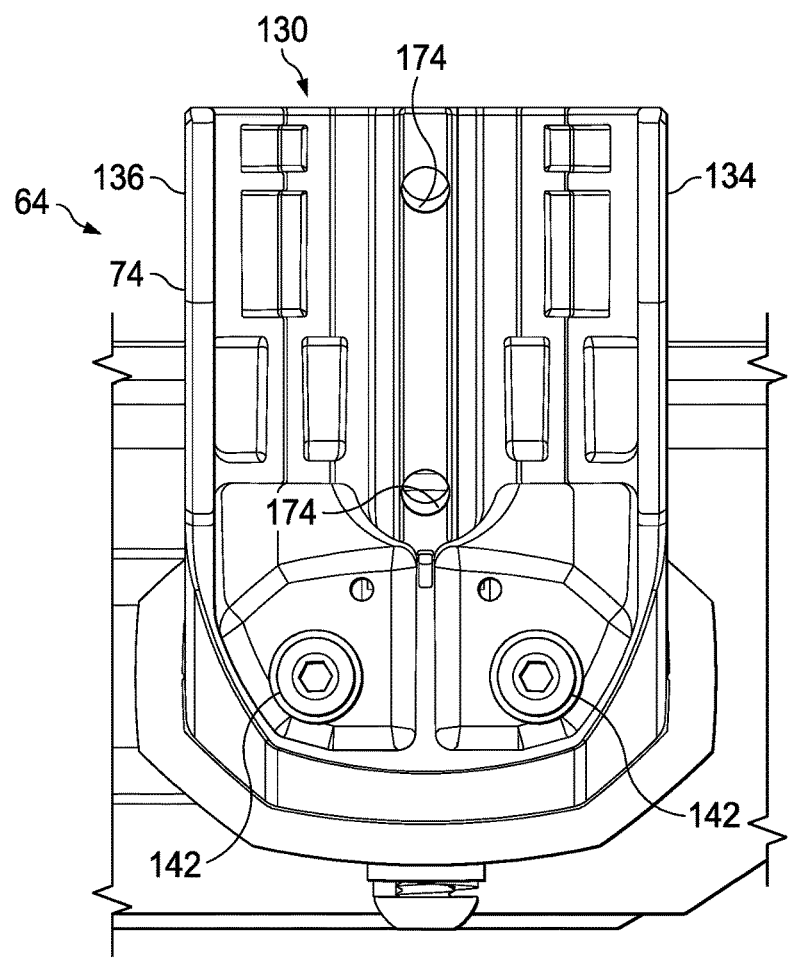
FIG. 10 is a fragmentary top view of the upper end region of the tower of FIG. 5, taken generally along line 10-10 of FIG. 8.

FIGS. 3 and 4 illustrate height adjustment of truck rack 50 via towers 64 thereof, while the bottom ends of the towers remain at the same distance from another (e.g., when the towers are already mounted to a truck via bases 62; also see FIG. 1). Only one crossbar assembly 58f is shown here, but the same height adjustment described here typically is performed on both crossbar assemblies. The height adjustment illustrated here may be performed while all towers 64 remain firmly mounted to a truck bed, i.e., without disconnecting towers 64 from bases 62 and without disconnecting crossbars 66 from towers 64.

FIGS. 3 and 4 show crossbar assembly 58f of truck rack 50 adjusted between its minimum and maximum heights. In FIG. 3, each inner tube 90 is fully retracted into outer tube 88. To make the height of truck rack 50 adjustable, fasteners 92 at each joint 98 of towers 64 may be loosened, and fasteners 168 attaching towers 64 to crossbar 66 at tower-crossbar joint 176 may be loosened (also see FIGS. 2 and 12). Towers 64 then may be extended upward, indicated by arrows at 178, as upper end portions 74 thereof slide axially inward along crossbar 66, indicated by arrows at 180. (Alternatively, starting with truck rack 50 in the configuration of FIG. 4, towers 64 may be retracted downward, as upper end portions 74 thereof slide axially outward along crossbar 66, to reduce the height of truck rack 50.) When the desired approximate height is reached, height-indicating indicia 118 on all towers 64 may be compared to equalize the tower heights (also see FIG. 5), which ensures that each crossbar 66 will be level and that both crossbars 66 will be at the same height. Fasteners 92 then may be tightened to fix each tower height.

Each crossbar 66 next may be centered axially over the corresponding pair of towers 64, such that a longitudinal center 182 of the crossbar is equidistant from each tower 64 of the pair (see FIGS. 3 and 4). Each crossbar 66 may have two sets of position-indicating (centering) indicia 184 arranged along opposite end portions thereof and rotationally offset from one another by 180 degrees (see FIG. 13A for a portion of one of the sets). Substantially the same position-indicating indicia 184 may be present on both end portions, so that the user knows crossbar 66 is centered along its long axis when each tower 64 is aligned with the same feature (e.g., the same number) of the corresponding set of position-indicating indicia 184. In the depicted example, each set of position-indicating indicia 184 has a series of numbers 186 arranged along an end portion of crossbar 66. Each number is repeated in the other set of position-indicating indicia 184, such that the distance between instances of the same number in the two sets is the same as the value of the number. For example, the set of position-indicating indicia 184 depicted in FIG. 13A includes the numbers "52", "53", and "54", which are 52, 53, and 54 inches, respectively, from the same numbers in the other set of position-indicating indicia 184. Each set of position-indicating indicia 184 may be located on the bottom (as depicted), at least one lateral side, and/or the top of crossbar 66.

II. EXEMPLARY BASES FOR A TRUCK RACK

This section describes exemplary bases 62 for securing towers 64 of truck rack 50 to the bed of a truck; see FIGS. 14-24.

Figure 14:
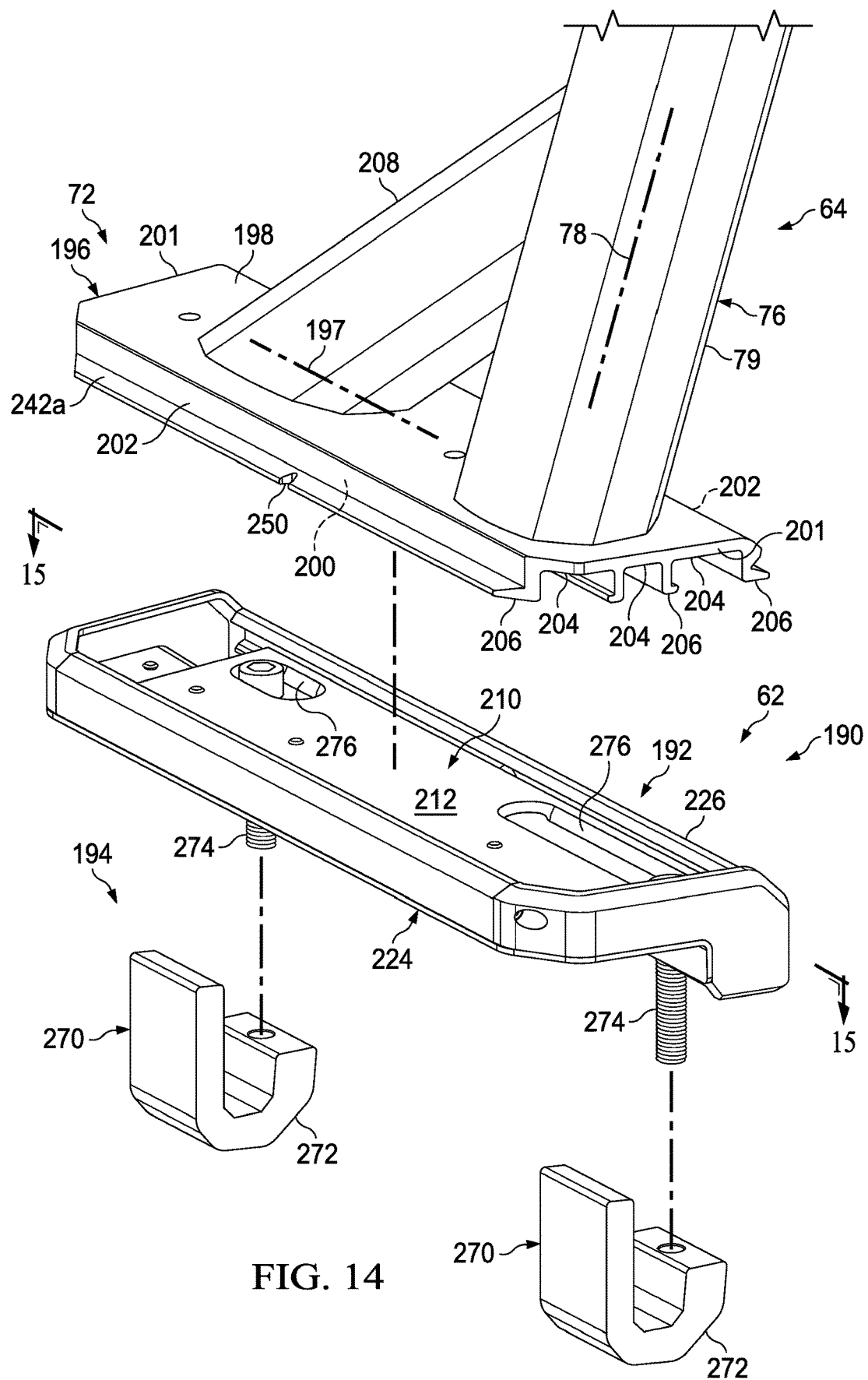
FIG. 14 is an exploded, fragmentary, oblique view of one of the towers of the truck rack of FIG. 1 and a corresponding base.
Figure 15:
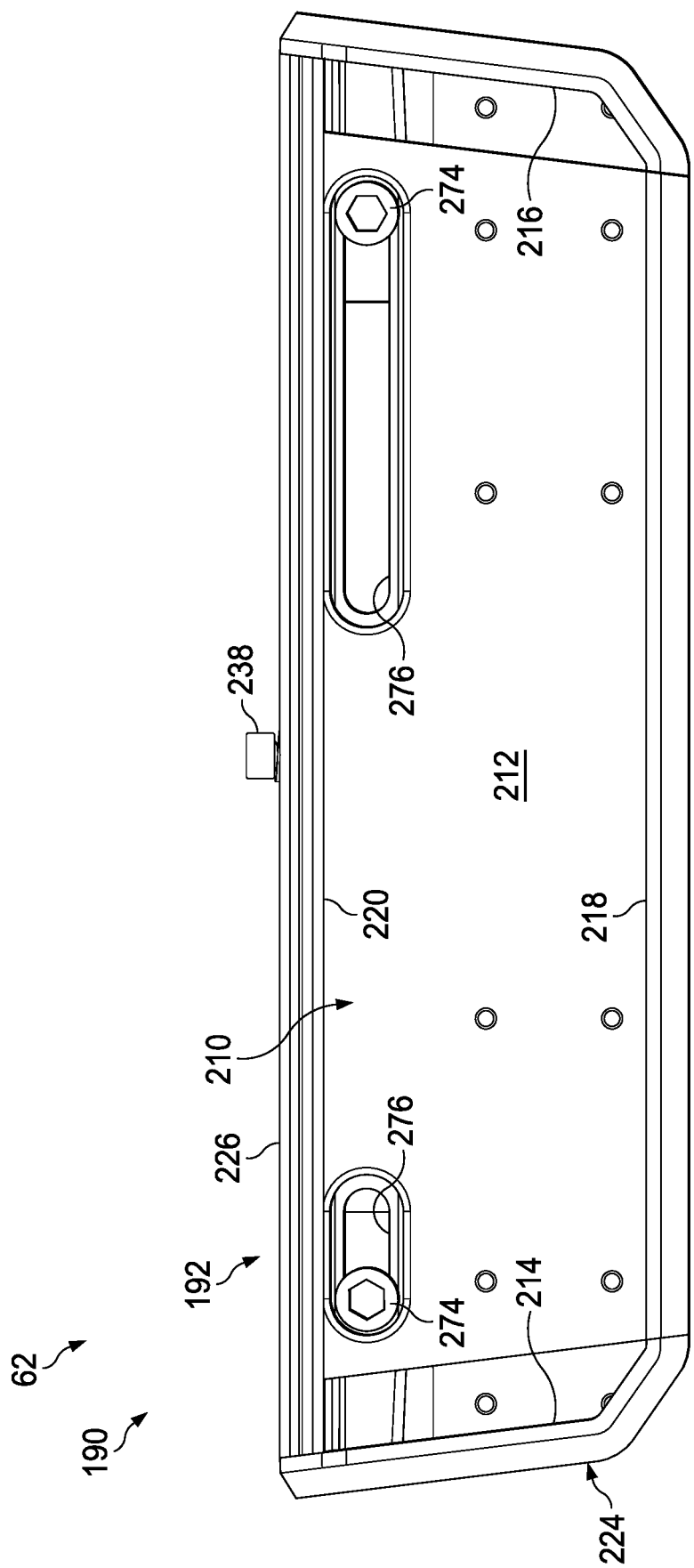
FIG. 15 is a top view of the base of FIG. 14, taken generally along line 15-15 of FIG. 14.
Figure 16:
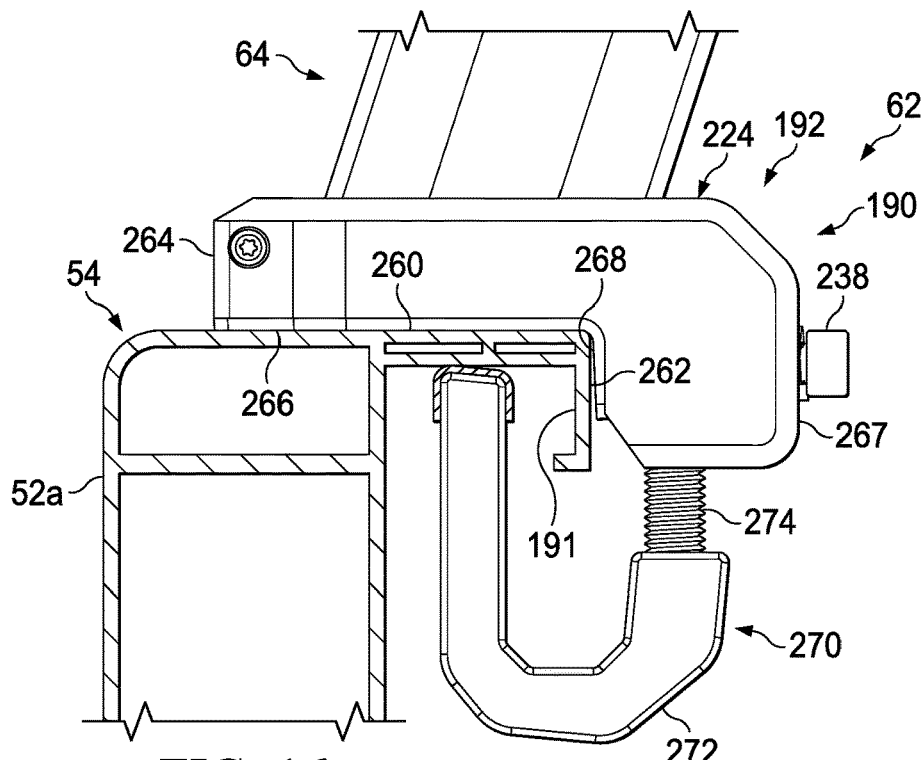
FIG. 16 is a fragmentary, sectional view of the truck rack and truck of FIG. 1, taken generally along line 16-16 of FIG. 1 through a bed rail of the truck.

FIGS. 14-19 show an illustrative example (base 190) of base 62 configured to be coupled to an upper wall region 60 of a truck bed 54 at a bed slot 191 that is open at the bottom (see FIG. 16). Base 190 includes a shoe member 192 connected to a coupling portion 194 (see FIG. 14).

Shoe member 192 may be configured to support and releasably secure a tower 64 (see FIGS. 14 and 17-19). More specifically, lower end portion 72 of tower 64 may form a foot 196 at a bottom end of the tower 64. Foot 196 may be received, supported, and secured by shoe member 192.

Foot 196 may be configured to be supported and secured in a substantially horizontal orientation on shoe member 192. Foot 196 has a length (L), a width (W), and a thickness (T), where L≥W>T. Length and width axes of the foot may be configured to be substantially horizontal, and a thickness axis of the foot may be configured to be substantially vertical. Accordingly, foot 196 may be described as a horizontal foot, which may define a substantially horizontal plane. The foot may be elongated to define a long axis 197, and the foot may be configured to be mounted to a truck's bed such that long axis 197 is substantially parallel to a longitudinal axis of the truck and/or a bed rail of the truck's bed.

Foot 196 has a top surface 198 and a bottom surface 200, and a thickness axis may extend between these surfaces. Top and bottom surfaces 198, 200 may be the major surfaces of foot 196 with the largest surface area, compared to end surfaces 201 and side surfaces 202. Accordingly, foot 196 may be described as a flat foot. Top surface 198 may define a plane. Bottom surface 200 may at least partially define surface features, such as one or more grooves 204 and/or one or more ridges 206, or may be planar, among others. Grooves 204 and ridges 206 may be parallel to one another, and optionally parallel to long axis 197.

Foot 196 may have a substantially constant cross-sectional shape (e.g., along its length), as shown here. The foot may be an extrusion, which may be machined to modify its shape.

A bottom end of intermediate portion 76 (or shaft 79) of tower 64 may be attached to foot 196. For example, the bottom end may be firmly attached to top surface 198, as shown, such as by welding, fasteners, and/or the like. Foot 196 may be described as a transverse foot, with the foot oriented transversely to intermediate portion 76. More specifically, a plane (and/or long axis 197) defined by foot 196 may be transverse to linear axis 78 of intermediate portion 76, where "transverse" means within about 60 degrees of orthogonal (i.e., the foot may be oblique or orthogonal). A brace member 208 of tower 64 may stabilize the attachment of intermediate portion 76 to foot 196. Brace member 208 may be attached at one end to foot 196 and at the other end to intermediate portion 76.

Figure 17:
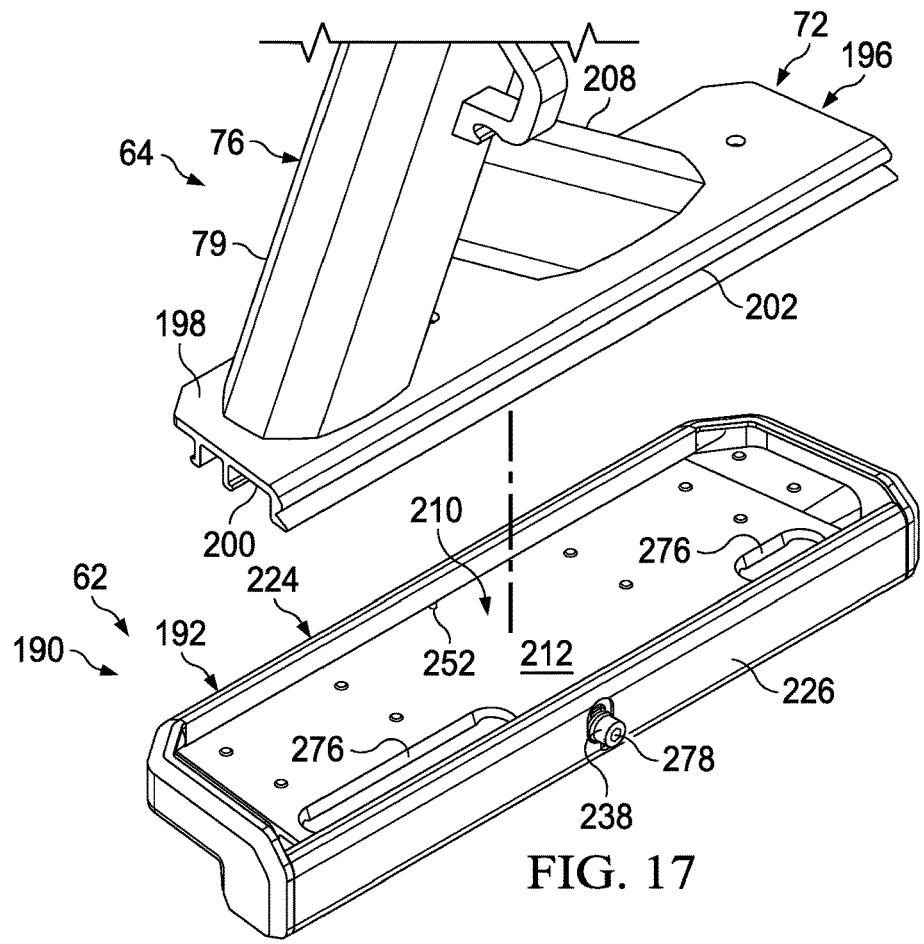
FIG. 17 is another exploded, fragmentary, oblique view of the tower and base of FIG. 14, taken generally from the opposite side relative to FIG. 14 and omitting bed-coupling members that couple the base to a bed rail of a truck.

Shoe member 192 may define a receiving area 210 in which foot 196 may be received, supported, and secured (see FIGS. 14, 15, and 17). The footprint of foot 196 may substantially match the horizontal perimeter of receiving area 210. Receiving area 210 may form a deck 212 as a floor of receiving area 210, and foot 196 may be supported on deck 212, optionally with bottom surface 200 of foot 196 contacting and/or facing the deck. Deck 212 may be substantially horizontal and flat. Receiving area 210 may have a plurality of walls 214, 216, 218, and 220 extending along edges of deck 212 and located above deck 212 (see FIG. 15). Any combination of shoe member 192, foot 196, receiving area 210, deck 212, wall 218, and wall 220 may be elongated generally along the longitudinal axis of the truck and/or transverse to a plane defined by the corresponding crossbar assembly.

Shoe member 192 may have a body 224 and a door 226 connected movably to body 224 (see FIG. 15). Body 224 may form end walls 214, 216 and an outer side wall 218 of receiving area 210. Each of walls 214, 216, and 218 may be fixed relative to one another, such that these walls remain stationary while foot 196 is received and secured by, and then later released from, base 190. Door 226 may form inner side wall 220 of receiving area 210.

Figure 18:
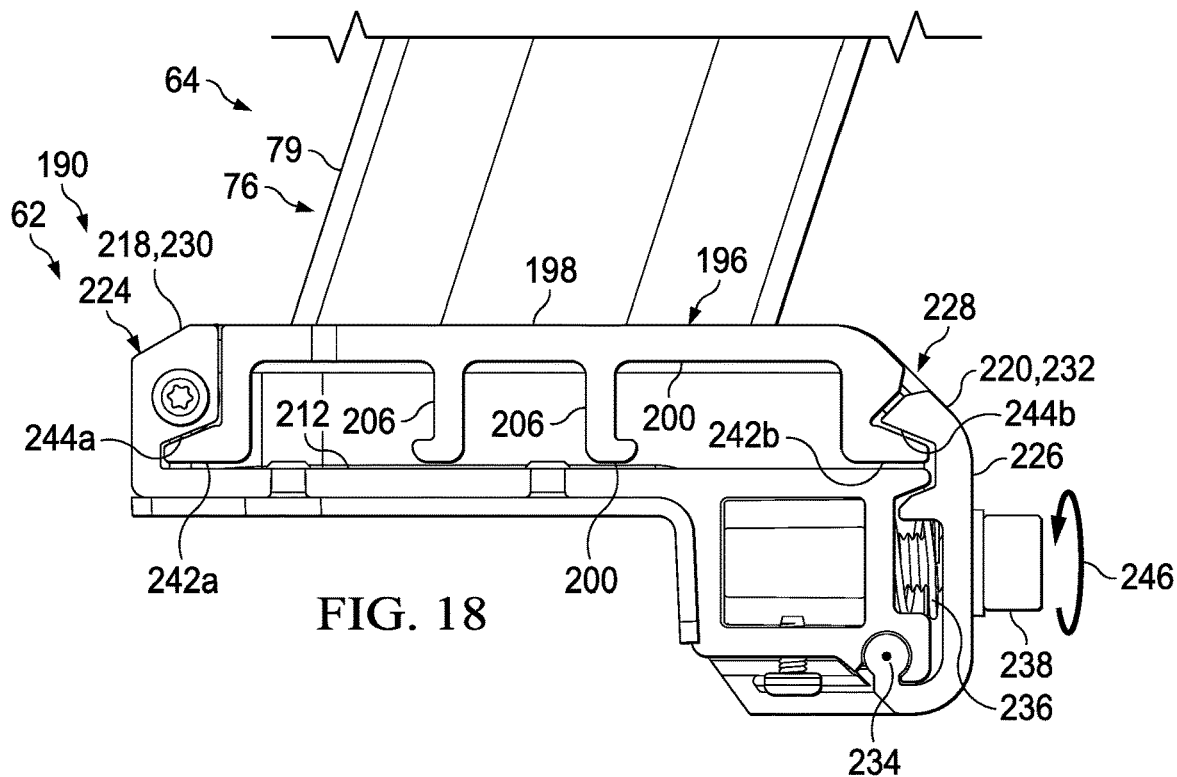
FIG. 18 is a fragmentary end view of the tower and base of FIG. 14, taken generally as in FIG. 16, but with an end plate of the base removed to reveal a foot of the tower, and with bed-coupling members of the base omitted.
Figure 19:
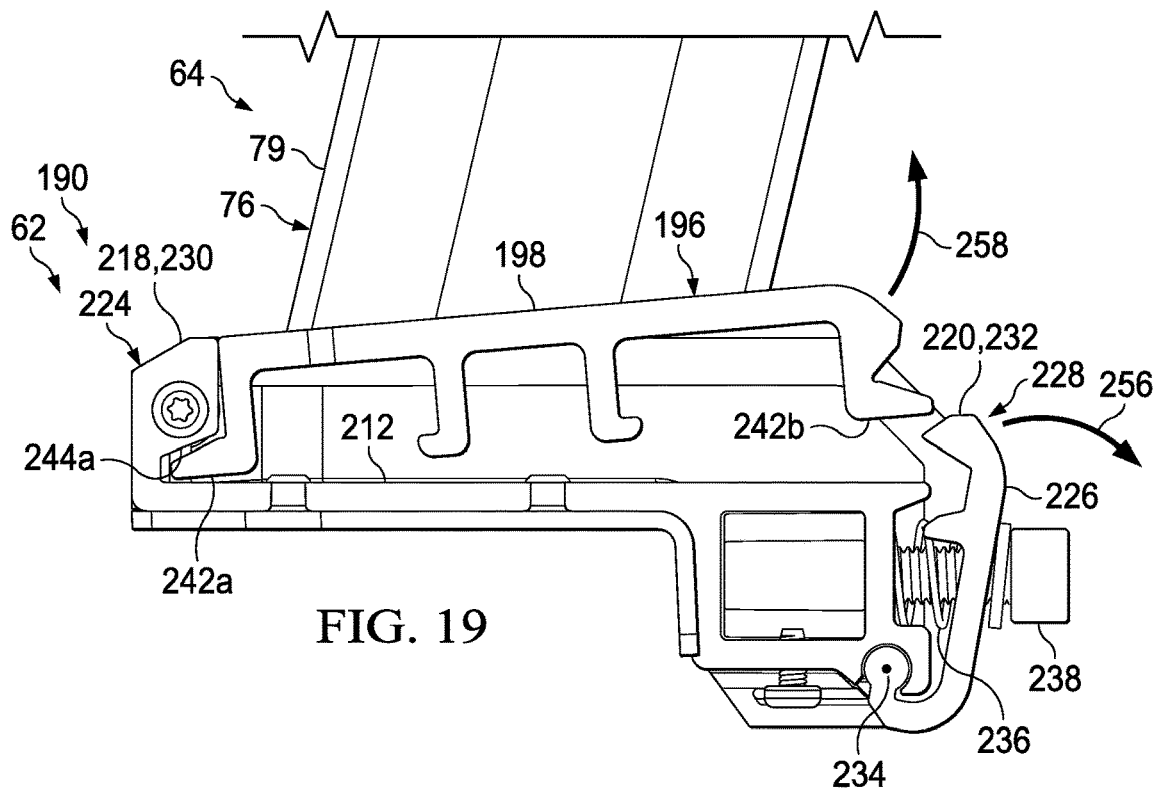
FIG. 19 is another fragmentary end view of the tower and base of FIG. 14, taken as in FIG. 18, except with a clamp of the base changed from the tower-securing configuration of FIG. 18 to a tower-releasing configuration, and with the foot of the tower being removed from the base.
Figure 20:
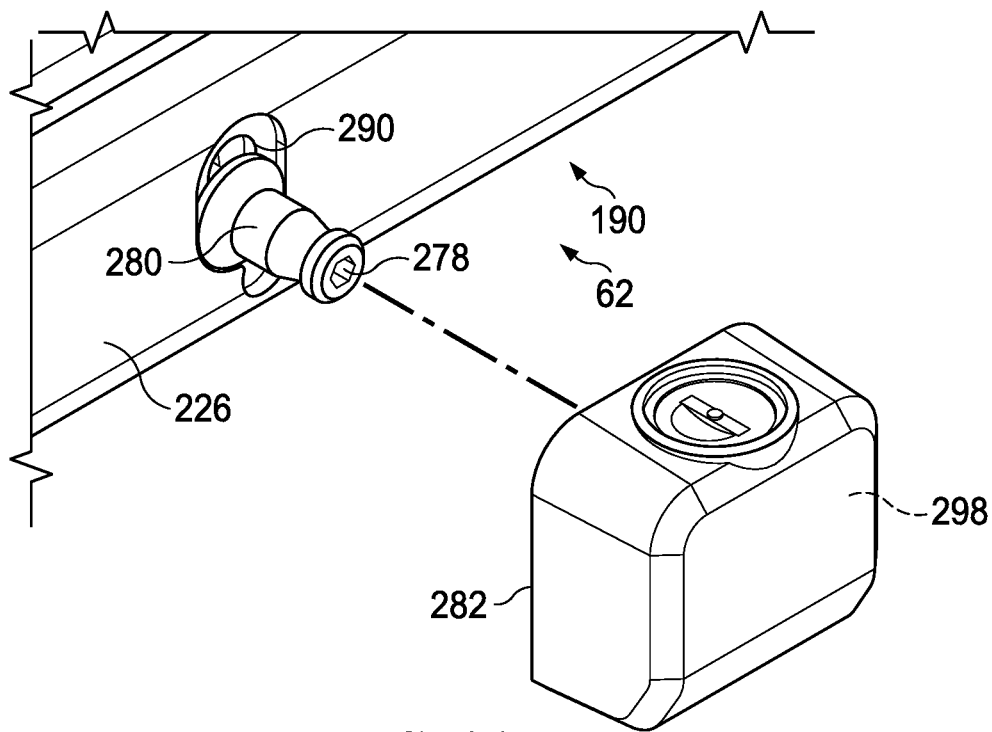
FIG. 20 is a fragmentary, exploded view of one of the two locking bases of the truck rack of FIG. 1, taken around a clamp actuator and a key-operated lock that restricts access to the clamp actuator.
Figure 21:
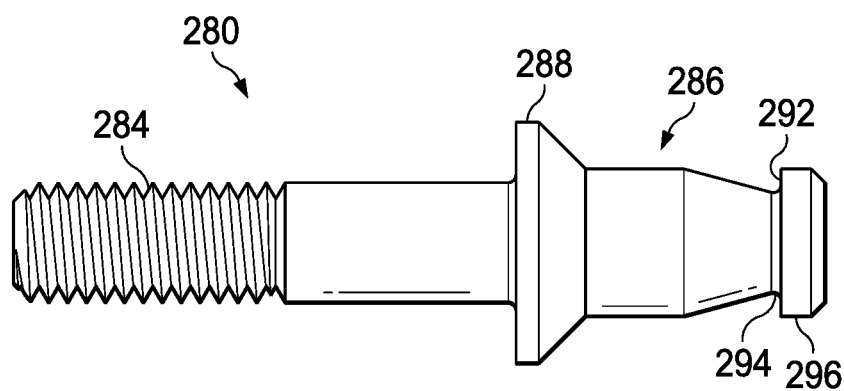
FIG. 21 is a side view of the clamp actuator of FIG. 20 taken in isolation.

Shoe member 192 may form a clamp 228 to secure foot 196 (see FIGS. 18 and 19). Clamp may use side walls 218, 220 of receiving area 210 as a fixed jaw 230 and a movable jaw 232, respectively. Door 226 may be pivotably connected to body 224 for rotation about an axis 234). A spring 236 may bias movable jaw 232 away from fixed jaw 230. A clamp actuator 238, such as an actuator bolt in threaded engagement with body 224, may be manipulated (e.g., rotated) to change the rotational orientation of movable jaw 232 and door 226, in part by altering the compression of spring 236.

Foot 196 may have a pair of flanges 242a, 242b arranged along opposite edges regions, such as substantially parallel to long axis 197 of the foot (also see FIG. 14). Each flange 242a, 242b may be configured to be received under a corresponding undercut region 244a, 244b formed in receiving area 210 by outer side wall 218 (and fixed jaw 230) and inner side wall 220 (and movable jaw 232), respectively.

Clamp 228 may be adjustable between a closed, tower-securing configuration (FIG. 18) and an open, tower-releasing configuration (FIG. 19) by manipulating clamp actuator 238 appropriately. The clamp may capture foot 196 in receiving area 210 by urging movable jaw 232 toward fixed jaw 230 with actuator 238, indicated by a rotation arrow at 246 (see FIGS. 14 and 18). Corresponding sloped surfaces formed by flange 242a and undercut region 244a, and/or by flange 242b and undercut region 244b may be compressed against one another to create a downward force on foot 196. This downward force urges foot 196 tightly against deck 212, as clamp 228 is adjusted to the tower-securing configuration, which also applies compression horizontally to foot 196 with jaws 230, 232. Ridges 206 may resist slippage more efficiently than a planar bottom surface by applying localized pressure to deck 212 when clamp 228 is tightened against foot 196.

Longitudinal motion of foot 196 in receiving area 210 may be restricted by inter-fitting structures after foot 196 is engaged by clamp 228. For example, flange 242a of foot 196 may form a notch 250 (or other recess) that fits together with a pin 252 (other protrusion) of body 224 located in receiving area 210 (see FIGS. 14 and 17). Alternatively, or in addition, flange 242a may have a protrusion that fits together with a corresponding recess of receiving area 210.

Rotating clamp actuator 238 in the opposite rotational direction allows spring 236 to urge movable jaw 232 away from fixed jaw 230 to a tower-releasing configuration, indicated at 256 (see FIG. 19). Foot 196 is no longer captured in receiving area 210 and can be removed, indicated by a motion arrow at 258.

Body 224 of shoe member 192 may be shaped to be placed onto a top wall 260 of a truck bed rail 52a and against an inner side wall 262 of rail 52a (see FIG. 16). The body may have an upper portion 264 having a bottom surface 266 configured to face, and optionally abut, top wall 260. A lower portion 267 of body 224 may project downward from upper portion 264 to form a shoulder 268 configured to be disposed adjacent, and optionally abut, inner side wall 262.

Coupling portion 194 of base 190 may include one or more coupling members 270 to mount shoe member 192 to truck bed 54 (see FIGS. 14 and 16). Each coupling member 270 may include a claw member 272 connected to shoe member 192 with at least one fastener, such as a bolt 274 in the depicted example. Shoe member 192 may define one or more apertures, such as slots 276, through which the shaft of each bolt 274 extends (see FIG. 15). Each slot 276 allows a coupling member 270 to slide along the slot before the coupling member is tightened against truck bed 54, to optimize the position of the coupling member.

Each coupling member 270 and shoe member 192 may cooperatively clamp a wall region of bed rail 52a to mount the shoe member to the bed rail. For example, in FIG. 16, upper portion 264 and claw member 272 are applying compression to a top wall region of the bed rail.

Each coupling member 270 may be disconnected from shoe member 192 by removing bolts 274. However, foot 196 located in receiving area 210 covers slots 276 and bolts 274 therein. Accordingly, foot 196 prevents unauthorized access to bolts 274, for removal of base 190 from truck bed 54, until foot 196 has been removed from receiving area 210. Since clamp 228 needs to be placed into its open, tower-releasing configuration to remove foot 196, preventing access to and/or manipulation of clamp actuator 238 can discourage theft. Head of actuator 238 in FIG. 17 has a non-standard driver interface 278, which requires a special driver to turn the clamp actuator. Driver interface 278 is a recess in the depicted example. The special driver may be provided when truck rack 50 is purchased.

Better theft protection is offered by use of a different clamp actuator 280 along with a key-operated security lock 282 (see FIGS. 1, 2, 20, and 21). Clamp actuator 280 may be a bolt having the same externally-threaded shaft 284 as clamp actuator 238, but a different head 286 (see FIG. 20). The head may have a radial protrusion 288 adjacent shaft 284. Radial protrusion 288 cannot pass through an elongated opening 290 in door 226 through which shaft 284 extends (see FIGS. 20 and 21). Accordingly, radial protrusion 288 contacts door 226 and opposes the action of spring 236 (also see FIGS. 18 and 19). Head 286 also may have a lock-engaging shoulder 292 located near the trailing end of clamp actuator 280. Shoulder 292 may be formed by a radial depression 294 and/or a radial projection 296. When lock 282 is operatively disposed on head 286, an obstructing member 298 inside the lock may enter radial depression 294, such that obstructing member 298 engages shoulder 292 if an attempt is made to pull lock off head 286, which prevents lock removal. Lock 282 covers non-standard driver interface 278 (or a standard driver interface), which prevents engagement with the corresponding driver. When lock 282 is unlocked with a corresponding key, obstructing member 298 may be retracted from radial depression 294, which allows lock 282 to be removed from head 286 and driver interface 278 to be accessed with a corresponding driver. Clamp actuator 280 and key-operated lock 282 may be utilized for only one base 62 of each pair of bases 62 under each crossbar assembly 58f, 58r, as illustrated in FIG. 2 for one of the crossbar assemblies.

Figure 22:
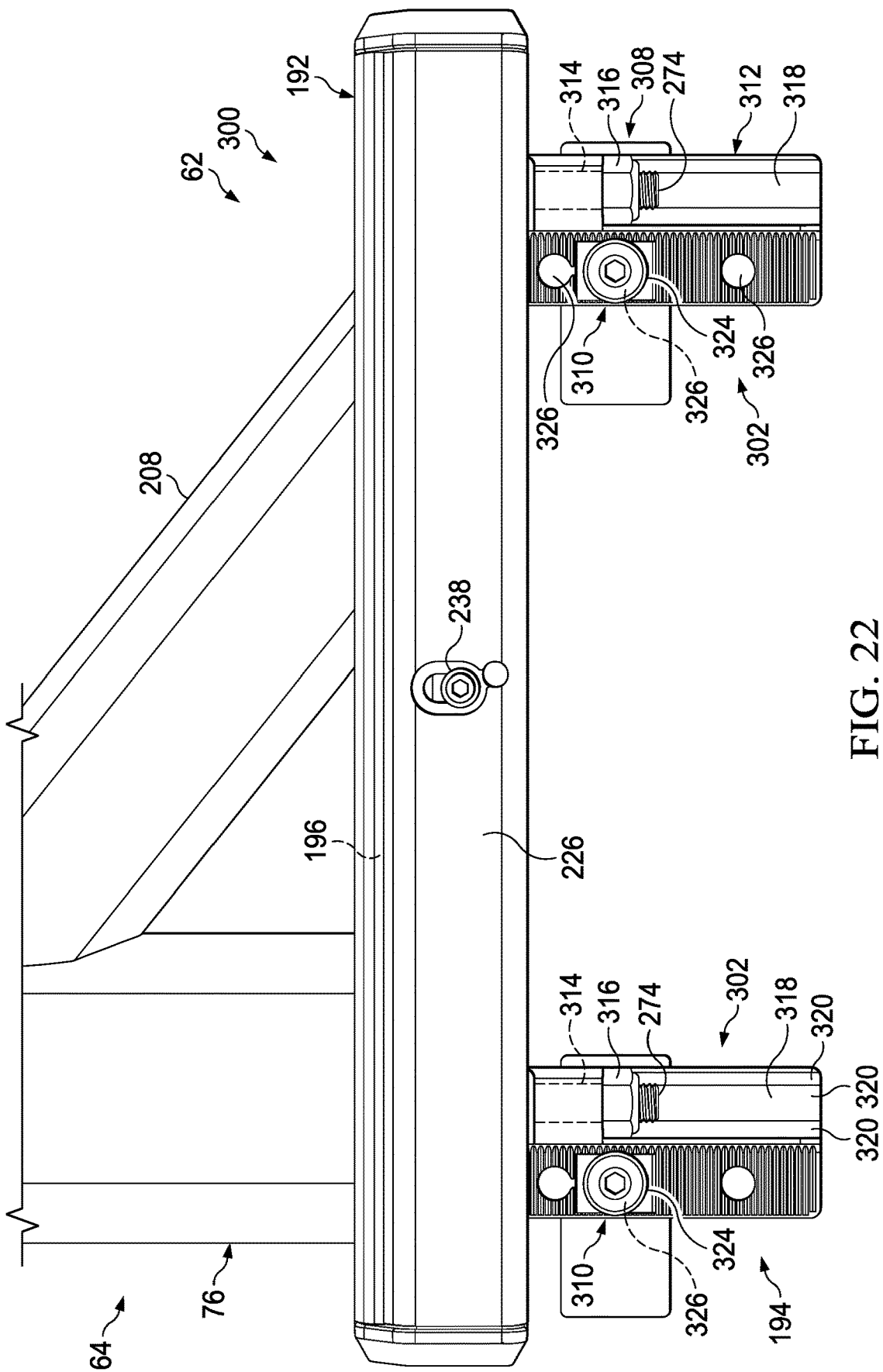
FIG. 22 is a side view of another exemplary base for mounting the truck rack of FIG. 1 to a different truck bed, taken with a fragmentary lower end region of a tower of the truck rack secured to the base.
Figure 23:
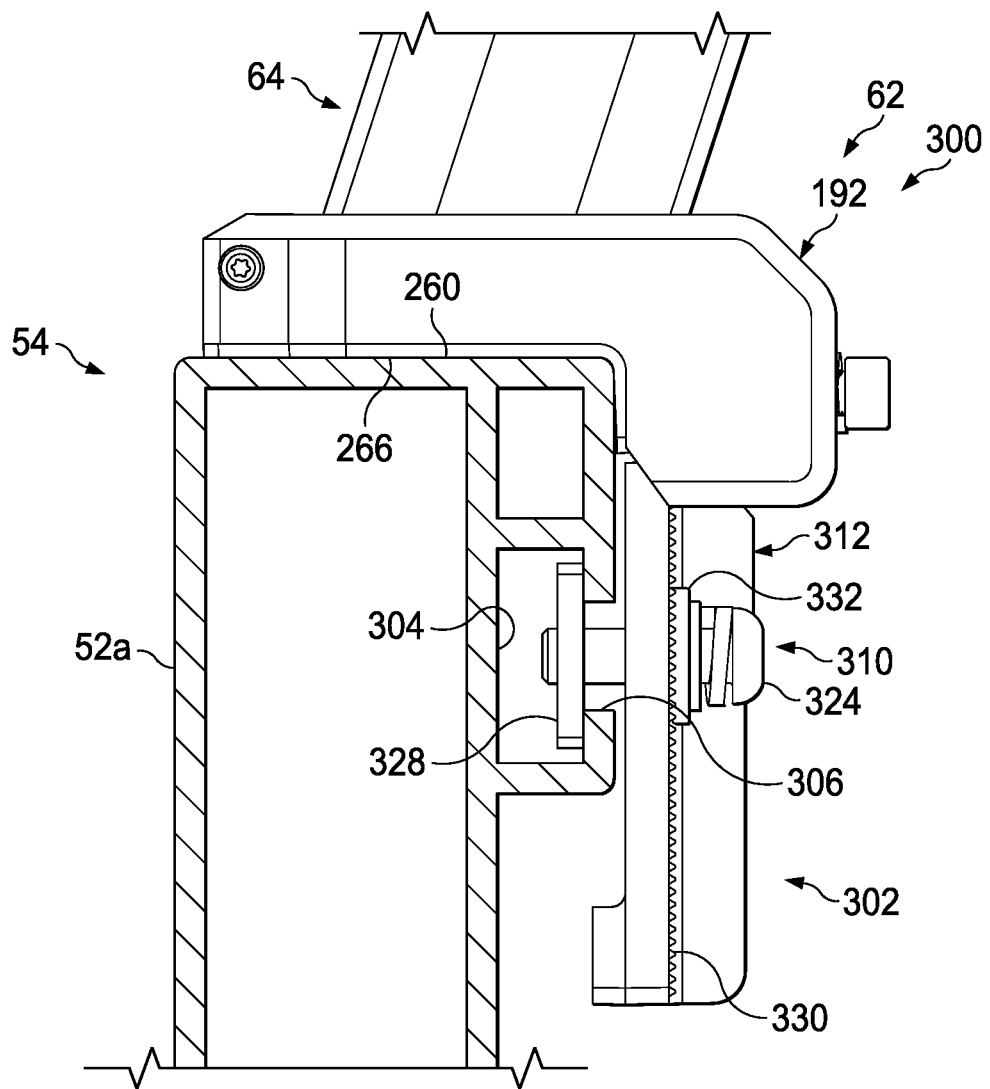
FIG. 23 is a fragmentary, sectional view of the truck rack of FIG. 1 incorporating the base of FIG. 22 in place of the base of FIG. 14, and mounted to a bed rail equipped with a side slot, taken generally as in FIG. 16.

FIGS. 22 and 23 show another illustrative example (base 300) of base 62 secured to a tower 64 of truck rack 50. Shoe member 192 of base 300 is identical to that of base 190 but coupling portion 194 is different (see FIG. 14). More specifically, coupling portion 194 of base 300 has a pair of coupling members 302 configured to mount shoe member 192 to a truck bed 54 having a T slot, namely, bed slot 304 (see FIG. 23). Bed slot 304 is open on a lateral side thereof to form a throat 306 intermediate the top and bottom of the bed slot. The bed slot is shown as being formed integrally with a bed rail 52a, but more commonly is created by a separate track member mounted to a wall of the truck bed.

Each coupling member 302 may have a pair of fastener assemblies 308, 310 (see FIG. 22). Shoe fastener assembly 308 connects a body 312 of coupling member 302 to shoe member 192 via deck slots 276 (also see FIG. 15). Bolts 274 extend through deck slots 276 and a hole 314 in body 312 and into threaded engagement with respective nuts 316. Body 312 may define a depression 318 to receive at least a portion of a nut 316. When located in depression 318 and engaged with a bolt 274, nut 316 can travel along depression 318 but is restricted from rotation by depression walls 320. Depression walls 320 are oriented to match facets of nut 316, and prevent productive access to opposite facets of nut 316 with a wrench or similar tool. Accordingly, as in base 190, when a tower 64 is secured to base 300 via foot 196, the heads of bolts 274 are covered by foot 196. With this configuration, base 300 cannot be uncoupled from truck bed 54 without opening clamp 228 via manipulation of clamp actuator 238 or 280 (also see FIGS. 18-21).

Bed-slot fastener assembly 310 connects coupling member 302 to bed slot 304 (see FIGS. 22 and 23). Bed-slot fastener assembly 310 has a bolt 324 that extends through an aperture 326 of body 312 and into threaded engagement with a nut member 328 located in bed slot 304. Body 312 has a ridged surface 330 that meshes with a corresponding ridged face of a washer 332 to resist slippage. The user may choose one of two or more apertures 326 for receiving bolt 324, to match the elevation of bed slot 304). In some examples, a pair of nut members 328 may be replaced by a single elongated nut member have a pair of internally threaded apertures for engagement with bolts 324. In some examples, aperture 326 may be elongated to allow a user to slide bolt 324 along aperture 326 to select the elevation of bolt 324.

Figure 24:
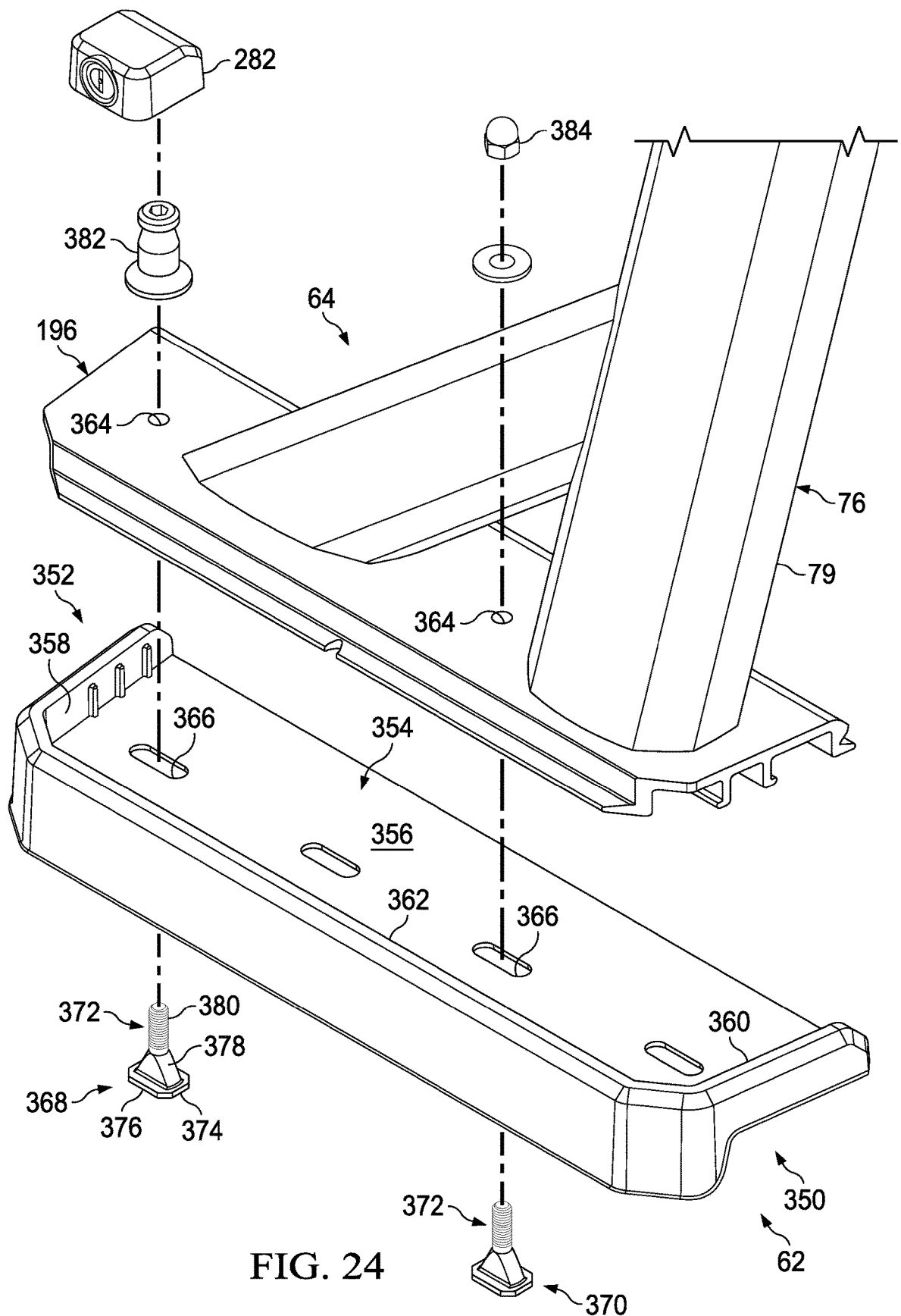
FIG. 24 is an exploded, oblique view of still another exemplary assembly of the same tower and a different base for the truck rack of FIG. 1, where the base is configured to be coupled to one of the bed rails of a truck bed having a tonneau cover.

FIG. 24 shows yet another illustrative example (base 350) of base 62 for mounting a tower 64 of truck rack 50 to a truck bed. Base 350 may be utilized for mounting truck rack 50 to a truck bed having a tonneau cover. The tonneau cover may be mounted on bed rails 52a, 52b using respective elongated rail caps having T slots arranged at least generally parallel to longitudinal axis 68 of the truck (also see FIG. 1). Each T slot may have a throat located above a channel, as described for upper slot 152 of crossbar 66 (e.g., see FIG. 13B).

Base 350 may have a shoe member 352 forming a receiving area 354 for foot 196 of tower 64. A floor of receiving area 354 provides a deck 356 on which foot 196 may be supported. End walls 358, 360 and a side wall 362 of receiving area 354 may be configured to match three sides of a perimeter shape of foot 196, to ensure that foot 196 is properly aligned with shoe member 352. More specifically, foot 196 and shoe member 352 may define respective sets of one or more apertures 364, 366 that are aligned with one another when foot 196 is placed on deck 356 and against at least one end wall 358, 360 and side wall 362.

Base 350 may include at least one fastener assembly, such as an access-restricted assembly 368 and an accessible fastener assembly 370, to secure foot 196 to the base. Each fastener assembly 368, 370 may have a bolt member 372 with a head 374 configured to be received in a T slot of the tonneau cover. Head 374 may include a wider, flanged region 376 for placement into the channel of the T slot, and a narrower, optionally tapered region 378 for placement into the throat of the T slot and through elongated apertures 366 of shoe member 352. An externally threaded shaft 380 extends from narrower region 378 of each bolt member 372 and through an aperture 364 of foot 196. Each fastener assembly 368, 370 has a respective nut member 382, 384 for threaded engagement with shaft 380 of the corresponding bolt 372. Security nut member 382 may be shaped similarly to the trailing region of clamp actuator 280, except for the addition of an internally-threaded bore (also see FIG. 21). After security nut member 382 is tightened against foot 196, key-operated lock 282 may be installed on nut member 382, as described above for base 190 (also see FIGS. 20 and 21). Nut member 384 may be externally faceted and accessible with a wrench or similar tool. However, removal of nut member 384 is not enough to uncouple base 350 from the truck bed, due to the presence of fastener assembly 368, thereby discouraging theft.

III. ILLUSTRATIVE SIDE RAIL

This section describes further aspects of exemplary side rail 70, which is configured to be attached to a pair of towers 64 of crossbar assemblies 58f, 58r on the same side of truck rack 50, and also describes exemplary rack accessories that are mountable to side rail 70; see FIGS. 1 and 25-30.

Figure 25:
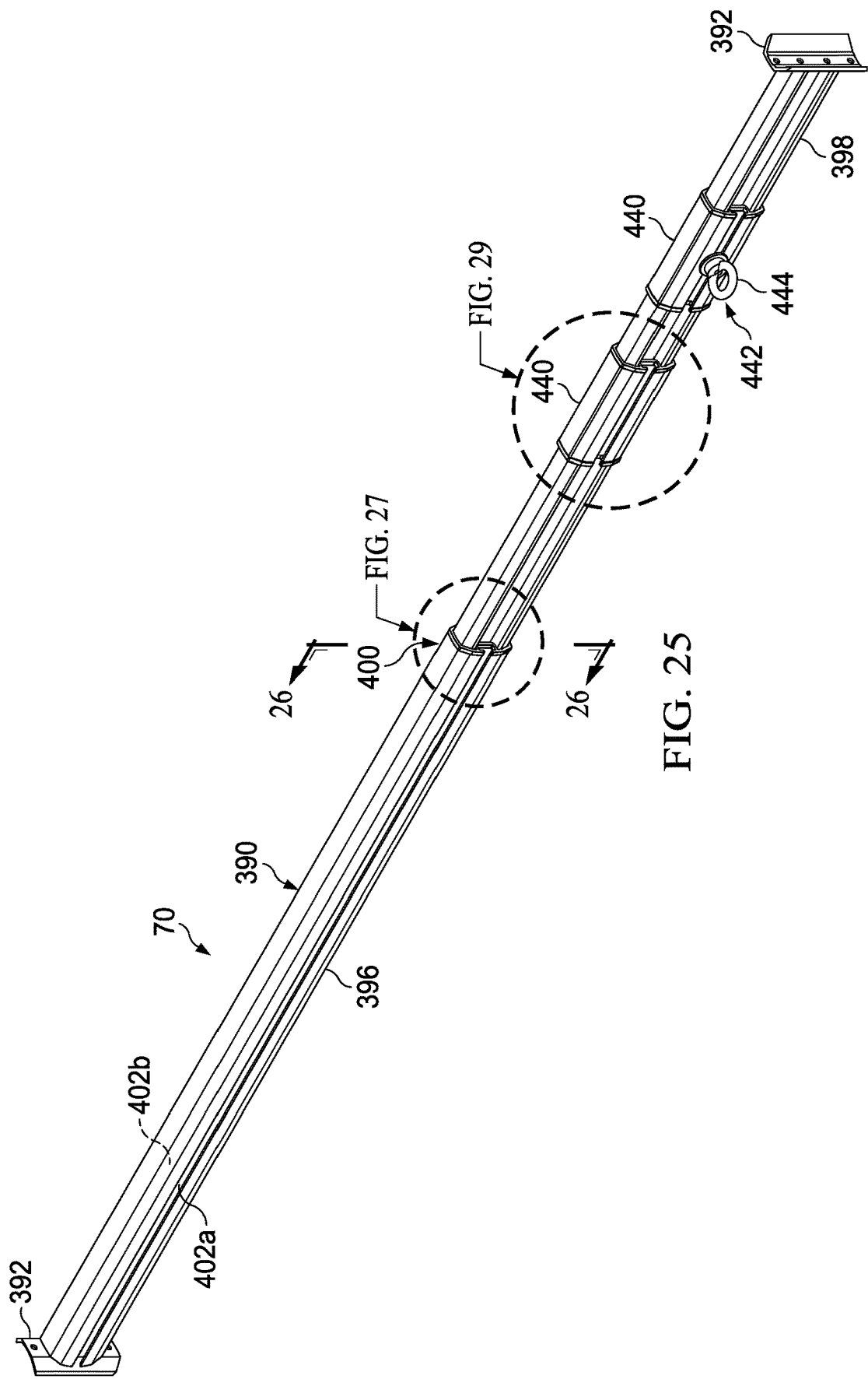
FIG. 25 is an isometric view of a side rail of the truck rack of FIG. 1, taken in isolation, with the side rail including a length-adjustable bar, and a pair of sleeves each movable along the bar, and with a rack accessory connected to the length-adjustable bar via one of the sleeves.
Figure 26:
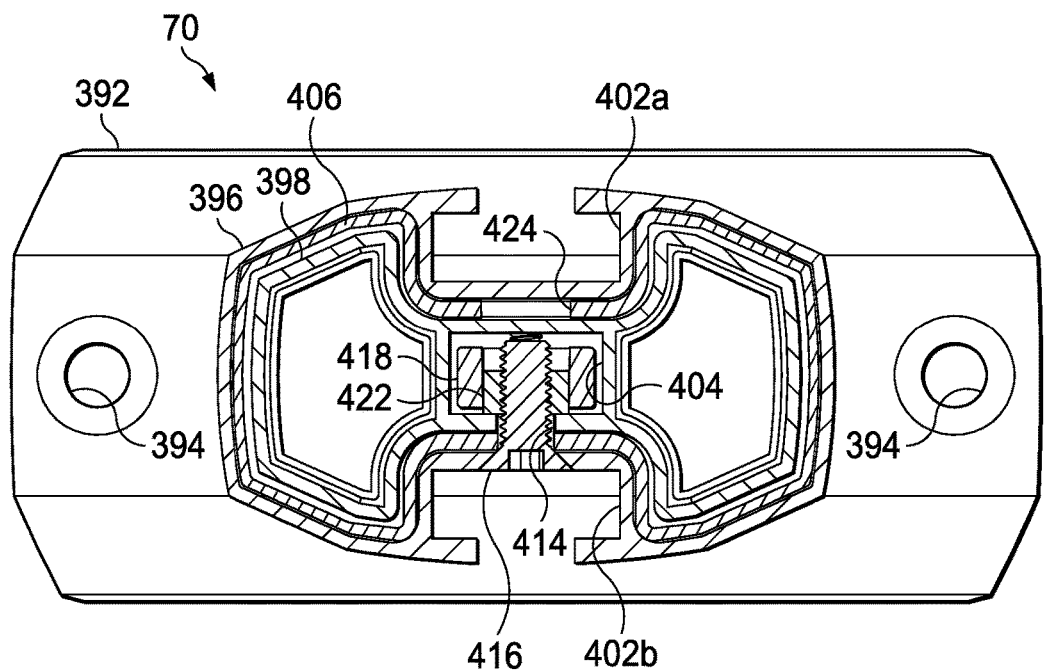
FIG. 26 is a sectional view of the side rail of FIG. 25, taken generally along line 26-26 of FIG. 25 through an adjustable joint at which the length-adjustable bar is changed between adjustable-length and fixed-length configurations.

Side rail 70 has a bar member 390 attached at opposite ends to a pair of brackets 392 (see FIGS. 25 and 26). Each bracket 392 may define one or more openings to receive one or more fasteners that attach the bracket to a tower 64 (see FIG. 1).

Side rail 70 may have an adjustable length provides by an ability of bar member 390 to telescope. Bar member 390 may include an elongated outer tube 396. An elongated inner member, such as an inner tube 398, may be slidably extendable from outer tube 396, and retractable into outer tube 396, to change the length of side rail 70. Outer tube 396 and inner tube 398 may be connected to one another at a joint 400 having adjustable and fixed configurations, which respectively permit and restrict length adjustment of side rail 70.

Outer and inner tubes 396, 398 each may have at least one axial slot, which may be a T slot (as described elsewhere herein). In the depicted example, outer tube 396 has a pair of slots 402a, 402b positioned opposite one another, and inner tube 398 has a single slot 404 (see FIGS. 25, 26, and 27).

Figure 27:
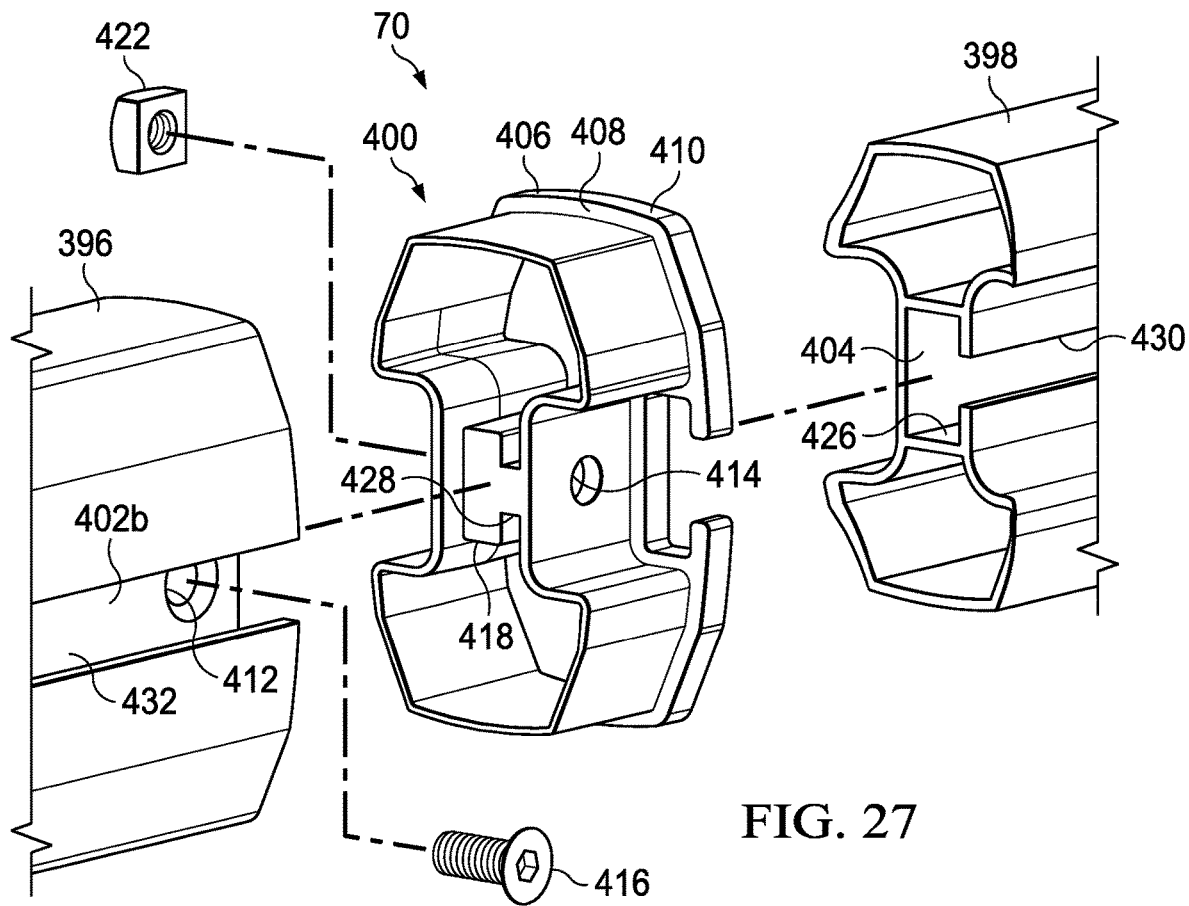
FIG. 27 is a fragmentary, exploded view of the side rail of FIG. 25, taken generally around the region indicated at "FIG. 27" in FIG. 25 toward an inner side of the side rail around an adjustable joint at which the length-adjustable bar can be changed between adjustable-length and fixed-length configurations.
Figure 28:
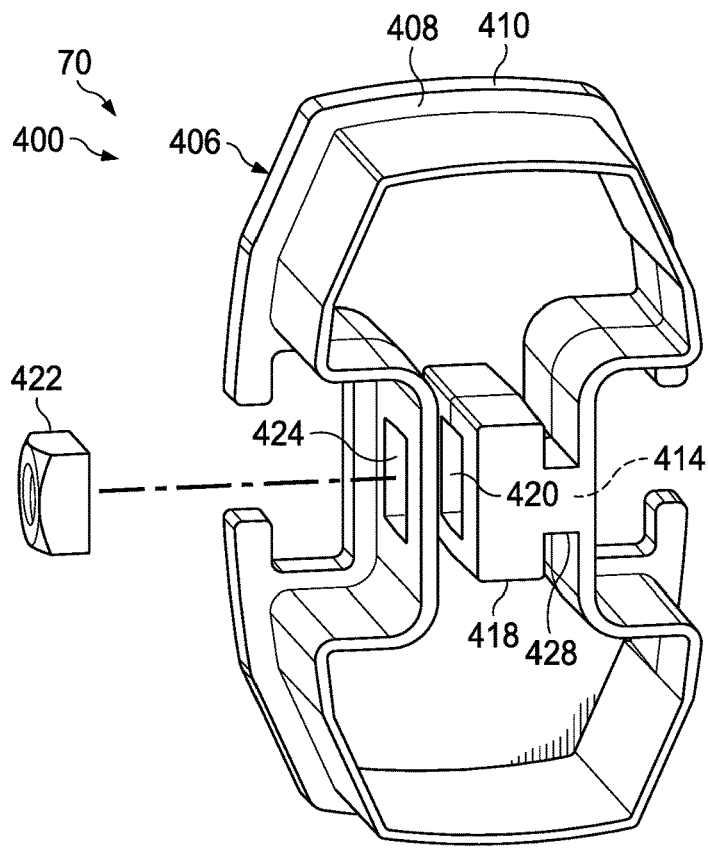
FIG. 28 is another exploded view of the adjustable joint of FIG. 27, taken from a different direction and showing only a bushing and a nut of the joint.

FIG. 27 shows an exemplary structure of joint 400, which has conceptual and structural similarity to joint 98 of tower 64 (also see FIGS. 6 and 7). Joint 400 includes a bushing 406 that has many similarities to bushing 108 of joint 98 (see FIGS. 27 and 28 and compare with FIGS. 6 and 7). Bushing 406 fits into an end region of outer tube 396 and has a shoulder 408 formed by a flange 410. Shoulder 408 is configured to stop advancement of bushing 406 into outer tube 396, such that an aperture 412 of outer tube 396 is aligned with a corresponding aperture 414 of bushing 406. A fastener, such as a bolt member 416, is configured to extend through apertures 412, 414. Bushing 406 also has a nut-positioning region 418 defining an opening 420 that is configured to receive a nut member 422 for engagement by bolt member 416 (see FIGS. 27 and 28). Bushing 406 may define another opening 424 aligned with opening 420 to permit placement of nut member 422 into nut-positioning region 418. Nut-positioning region 418 may be configured to be received in a channel 426 of slot 404 of inner tube 398. A neck region 428 of bushing 406 adjacent nut-positioning region 418 may be configured to be received in a throat 430 of slot 404. Tightening a fastener assembly including bolt member 416 and nut member 422 fixes the length of side rail 70. The head of bolt member 416 may be substantially flush or recessed with respect to a back wall 432 of slot 402b to avoid obstructing travel of a rack accessory along slot 402b. Accordingly, aperture 412 may have a countersink to receive the head of bolt member 416.

In some examples, bar member 390 may have a length determined by a pair of outer tubes 396 connected to one another via inner tube 398 and a pair of joints 400. The pair of outer tubes 396 each may be attached at their outer ends to brackets 392.

Side rail 70 may have one or more sleeves 440 connected to bar member 390 (see FIG. 25). Each sleeve 440 may be configured to be coupled to and support a rack accessory 442, such as an eye-bolt member 444, as shown here. Sleeve 440 may be disposed over inner tube 398, and may be configured to be adjustable between a slidable configuration and fixed configuration. In the slidable configuration, sleeve 440 can slide along inner tube 398, whether or not the length of side rail 70 has been fixed at joint 400. In the fixed configuration, sleeve has a fixed position along inner tube 398. The length of sleeve 440 may be substantially less than that of bar member 390, outer tube 396, and/or inner tube 398.

Figure 29:
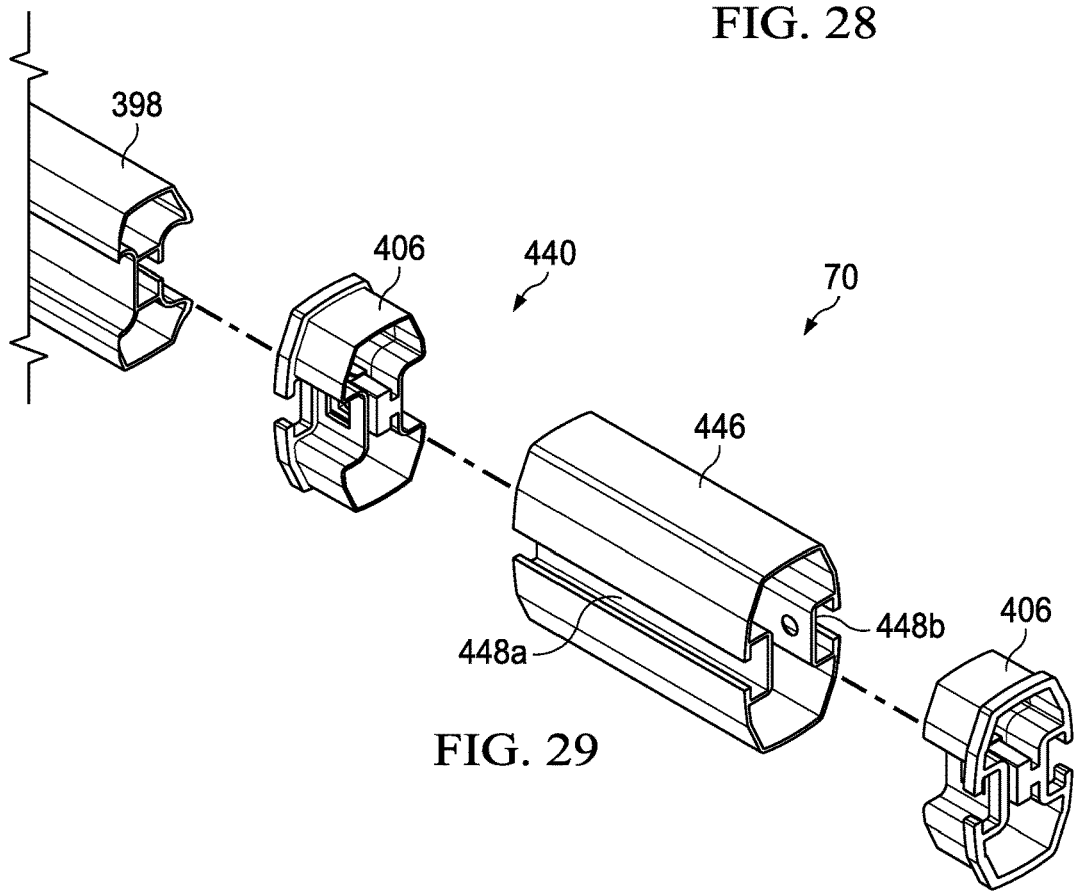
FIG. 29 is an exploded view of a region of the side rail of FIG. 25 indicated generally at "FIG. 29" in FIG. 25 and taken around one of the two sleeves of the side rail.

An exemplary structure of sleeve 440 is shown in FIG. 29. Sleeve 440 may include a tube member 446 having one or more axial slots, such as two axial slots 448a, 448b. Tube member 446 may be substantially identical to outer tube 396 in cross-section. Sleeve 440 may form a pair of joints with inner tube 398. Each joint may be structured as described above for joint 400 and thus may include a bushing 406, a bolt member 416, and a nut member 422. Sleeve 440 may be adjusted between slidable and fixed configurations by loosening and tightening bolt members 416 of the sleeve joints.

Figure 30:
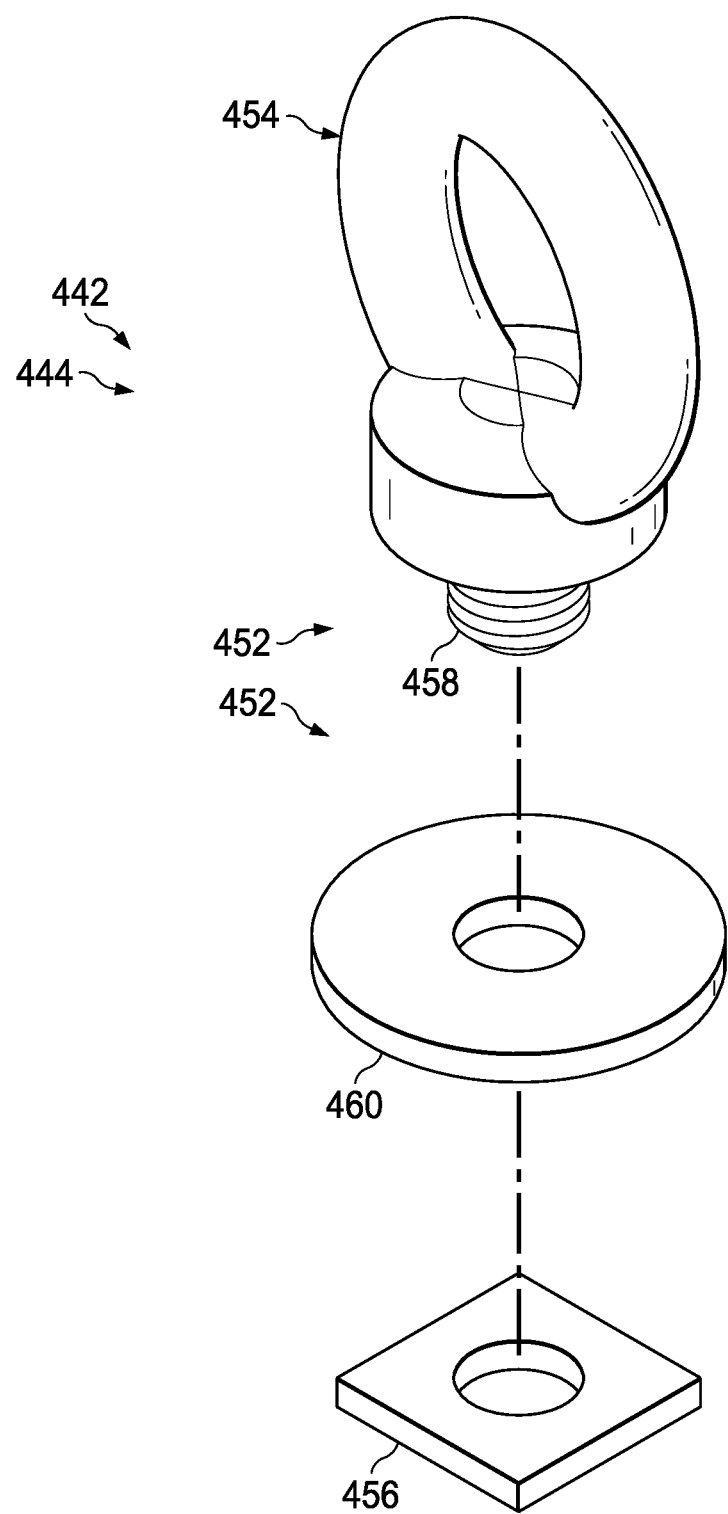
FIG. 30 is an exploded view of the rack accessory of FIG. 25.
Figure 31:
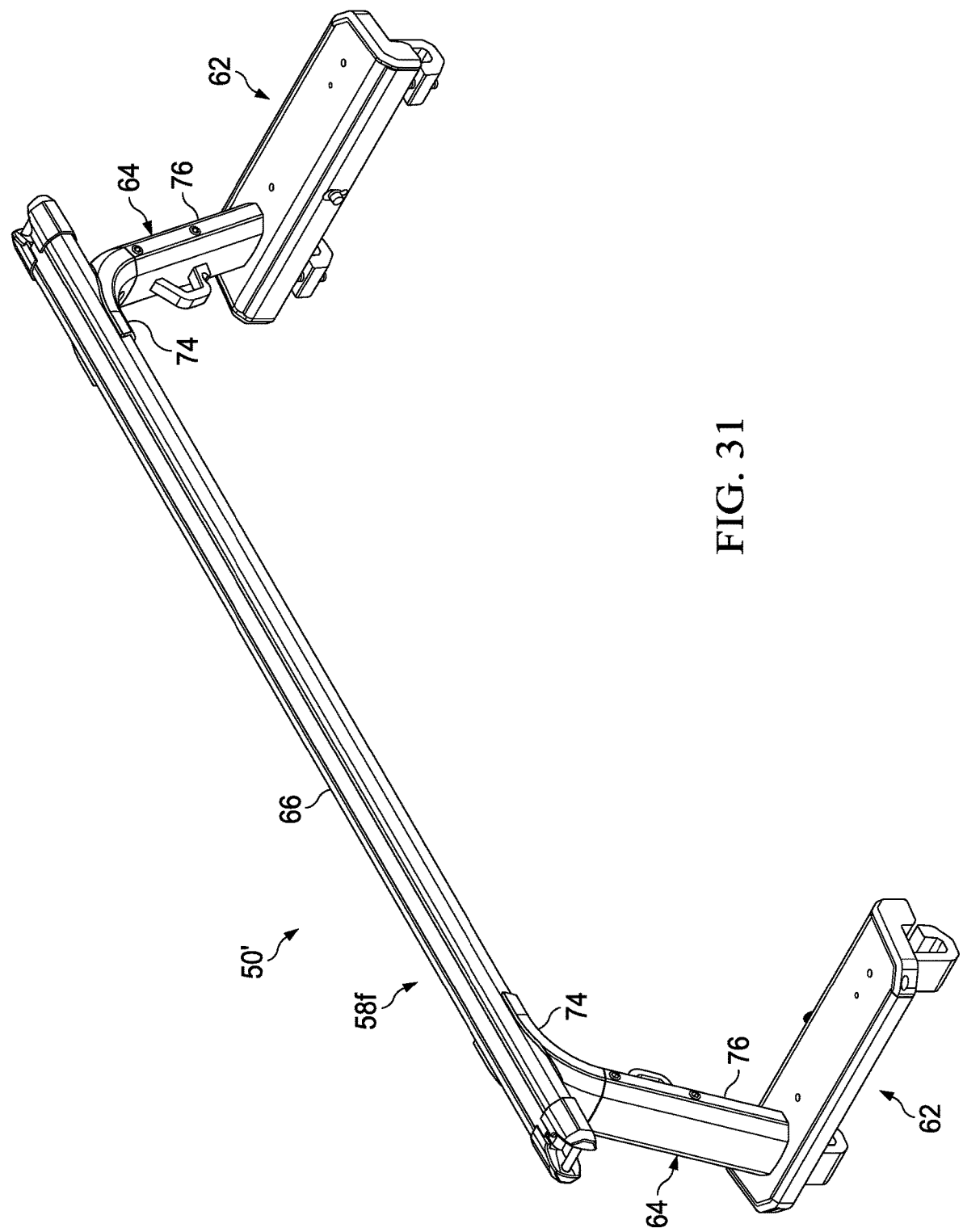
FIG. 31 is an isometric view of a fixed-height crossbar assembly for an illustrative truck rack that is the same as the truck rack of FIG. 1, except that each tower has a fixed-length intermediate portion.

FIG. 30 shows an exemplary structure for rack accessory 442. The rack accessory has a rack-coupling portion 452 and a cargo-coupling portion 454. Rack-coupling portion 452 may be configured to attach rack accessory to any or all of the T slots of the present disclosure, such as T slots 100a, 100b of towers 64, lower and upper T slots 150, 152 of crossbars 66, T slots 402a, 402b of outer tube 396 of side rail 70, and/or T slots 448a, 448b of sleeves 440. The rack-coupling portion 452 may include a first fastening member 456, such as a member or a bolt member, among others, to be received and retained in the channel of the T slot, and a second fastening member 458, such as a bolt member or a nut member, that engages first fastening member 456. A washer 460 may be disposed on the tube forming the T slot, at a position adjacent the throat of the T slot. Cargo-coupling portion 454 may include any suitable structure for interfacing with cargo (e.g., recreational equipment, tools, pieces of stock lumber, etc.) or cargo-securing members (e.g., straps, belts, cords, ropes, mesh, etc.). Other suitable rack accessories may include load stops, recovery track holders, ladder rollers, bicycle mounts, wheel holders, kayak saddles, etc.

IV. EXAMPLES

The following examples describe further aspects and examples of a truck rack, including rack components and rack accessories, to support cargo over a bed of a truck, and methods of constructing, assembling, mounting, adjusting, and using the truck rack. These examples, and those described above in Sections I-III, are intended for illustration only and should not limit or define the entire scope of the present disclosure.

Example 1. Truck Rack with Non-Adjustable Height

This section describes an illustrative truck rack 50' that is similar to the truck rack of FIG. 1, except that the height of towers 64 is non-adjustable. Only one crossbar assembly 58f is shown. Intermediate portion 76 of each tower does not telescope but instead has a fixed, non-adjustable length.

Example 2. Selected Examples

This example describes selected examples of the present disclosure as a series of indexed paragraphs.

Paragraph A1. A truck rack, comprising: (a) a tower having a foot and an upper end portion that is configured to support a crossbar; and (b) a base configured to mount the tower on an upper wall region of a truck bed, the base including a deck on which to support the foot and at least one securing device to secure the foot on the deck.

Paragraph A2. The truck rack of paragraph A1, wherein the deck is configured to support the foot substantially horizontally.

Paragraph A3. The truck rack of paragraph A1 or A2, where the foot has a bottom surface configured to face the deck.

Paragraph A4. The truck rack of any of paragraphs A1 to A3, wherein the tower is elongated along a linear axis, and wherein the foot is oriented transverse to the linear axis.

Paragraph A5. The truck rack of paragraph A4, wherein the foot is oblique to the linear axis or orthogonal to the linear axis.

Paragraph A6. The truck rack of any of paragraphs A1 to A5, wherein the foot has a top surface defining a plane.

Paragraph A7. The truck rack of paragraph A6, wherein the plane is transverse to a long axis defined by the tower, either oblique or orthogonal to the long axis.

Paragraph A8. The truck rack of any of paragraphs A1 to A7, wherein the foot has a top surface configured to be substantially horizontal when the foot is supported on the deck.

Paragraph A9. The truck rack of any of paragraphs A1 to A8, wherein the tower includes an intermediate portion defining a long axis, and wherein the foot is elongated transverse (oblique or orthogonal) to the long axis of the intermediate portion.

Paragraph A10. The truck rack of any of paragraphs A1 to A9, wherein the foot has a top surface and a bottom surface, and wherein the bottom surface is supported on the deck.

Paragraph A11. The truck rack of paragraph A10, wherein the bottom surface defines a plurality of grooves.

Paragraph A12. The truck rack of any of paragraphs A1 to A11, wherein the at least one securing device includes a clamp configured to engage opposite edge regions of the foot.

Paragraph A13. The truck rack of paragraph A12, wherein the opposite edge regions are each intersected by the same substantially horizontal plane.

Paragraph A14. The truck rack of paragraph A12 or A13, wherein the opposite edge regions are substantially linear and/or substantially parallel to one another.

Paragraph A15. The truck rack of any of paragraphs A12 to A14, wherein the clamp has a fixed jaw and a movable jaw arranged along opposite edges of the deck.

Paragraph A16. The truck rack of any of paragraphs A12 to A15, wherein at least one of the opposite edge regions of the foot has a sloped surface that engages a corresponding sloped surface of the base to urge the foot downward as the clamp is tightened against the opposite edge regions.

Paragraph A17. The truck rack of any of paragraphs A12 to A16, wherein the base includes a shoe member defining a receiving area for the foot, and wherein the clamp is configured to capture the foot in the receiving area.

Paragraph A18. The truck rack of paragraph A17, wherein the receiving area includes a plurality of walls located around the deck, and wherein the plurality of walls are configured to limit horizontal movement of the foot before the clamp is tightened against the foot.

Paragraph A19. The truck rack of paragraph A17 or A18, wherein the deck is a recessed region of the receiving area.

Paragraph A20. The truck rack of any of paragraphs A17 to A19, wherein the receiving area substantially matches a shape of the foot at its horizontal perimeter.

Paragraph A21. The truck rack of any of paragraphs A17 to A20, wherein the receiving area includes an undercut wall region, and wherein one of the opposite edge regions is formed by a flange, and wherein the flange is configured to be received under the undercut wall region.

Paragraph A22. The truck rack of paragraph A21, wherein the flange is tapered in a plane orthogonal to a long axis of the foot.

Paragraph A23. The truck rack of any of paragraphs A1 to A22, wherein the base includes a shoe member that defines a receiving area for the foot, and wherein the receiving area includes at least three walls located above the deck and extending along at least three edges of the deck.

Paragraph A24. The truck rack of any of paragraphs A1 to A23, wherein the base includes at least one fastener assembly configured to extend between an aperture of the base and an aperture of the foot.

Paragraph A25. The truck rack of paragraph A24, wherein the aperture of the base intersects the deck.

Paragraph A26. The truck rack of paragraph A24 or A25, wherein the base is configured to be mounted to a slot of a tonneau cover.

Paragraph A27. The truck rack of any of paragraphs A24 to A26, wherein the base is configured to be mounted to a T slot that is open on top.

Paragraph A28. The truck rack of any of paragraphs A1 to A27, wherein the base includes at least one coupling member configured to attach the base to a (horizontal) slot associated with the truck bed.

Paragraph A29. The truck rack of paragraph A28, wherein the slot is a T slot. Paragraph A30. The truck rack of paragraph A29, wherein the T slot is open at a top of the T slot, or is open between a top and a bottom of the T slot.

Paragraph A31. The paragraph of any of paragraphs A28 to A30, wherein the slot is open at a bottom thereof.

Paragraph A32. The truck rack of any of paragraphs A1 to A31, wherein the base includes a shoe member, and wherein the base includes a coupling member having a claw member connected to the shoe member via a threaded fastener.

Paragraph A33. The truck rack of any of paragraphs A1 to A32, wherein the foot covers an area of the base, and wherein the area covered is wider and longer than a width or diameter of the tower adjacent the foot.

Paragraph A34. The truck rack of any of paragraphs A1 to A33, wherein the foot is configured to prevent removal of the base mounted on the upper wall region of a truck bed while the foot is secured to the base.

Paragraph A35. The truck rack of any of paragraphs A1 to A34, wherein the base includes a shoe member forming the deck and one or more coupling members configured to mount the shoe on the upper wall region of a truck bed, wherein each of the coupling members includes a fastener having a head, and wherein the foot is configured to cover the head of the fastener of each coupling member.

Paragraph A36. The truck rack of any of paragraphs A1 to A35, wherein the foot forms a junction with an intermediate portion of the tower and extends beyond a perimeter of the intermediate portion adjacent the junction in a plane transverse to the intermediate portion.

Paragraph A37. The truck rack of any of paragraphs A1 to A36, wherein the foot covers an area on the deck that is substantially larger than a cross-sectional area of an intermediate portion of the tower adjacent the foot.

Paragraph A38. The truck rack of any of paragraphs A1 to A37, wherein the deck includes a substantially horizontal surface facing upward.

Paragraph A39. The truck rack of any of paragraphs A1 to A38, wherein the foot and the base have features that fit together when the foot is secured on the deck, to restrict longitudinal motion of the foot with respect to the base.

Paragraph A40. The truck rack of paragraph A39, wherein the features that fit together include a recess of one of the foot and the base that fits together with a projection formed by the other of the foot and the base.

Paragraph A41. The truck rack of any of paragraphs A1 to A40, wherein the base includes a shoe member that forms the deck, wherein the base includes at least one first coupling member that is removably interchangeable with at least one second coupling member, wherein the at least one first coupling member is configured to attach the shoe member to a first slot of a first truck bed, wherein the at least one second coupling member is configured to attach the shoe member to a second slot of a second truck bed, wherein the first slot is open at a bottom thereof, and wherein the second slot is open along a side thereof between a top and a bottom of such slot.

Paragraph A42. The truck rack of any of paragraphs A1 to A41, wherein the foot is a flat foot.

Paragraph A43. The truck rack of any of paragraphs A1 to A42, wherein the foot is a plate member and/or an extrusion.

Paragraph A44. The truck rack of any of paragraphs A1 to A43, wherein the base (e.g., the shoe member) and the foot are configured to be stacked on an upper wall region of a truck bed.

Paragraph B1. A truck rack, comprising: (a) a tower having a foot and an upper end portion that is configured to support a crossbar; and (b) a base configured to be mounted on an upper wall region of a truck bed and having a clamp to engage opposite edge regions of the foot, to releasably secure the tower to the base.

Paragraph B2. The truck rack of paragraph B1, wherein the clamp is configured to be adjustable between foot-securing and foot-releasing configurations while the base remains mounted to the upper wall region of a truck bed.

Paragraph B3. The truck rack of paragraph B1 or B2, wherein at least one of the opposite edge regions is elongated along a linear axis.

Paragraph B4. The truck rack of any of paragraphs B1 to B3, wherein the opposite edge regions are substantially parallel to one another.

Paragraph B5. The truck rack of any of paragraphs B1 to B4, wherein the base includes a deck and wherein the foot is configured to be supported substantially horizontally on the deck.

Paragraph B6. The truck rack of any of paragraphs B1 to B5, the base includes a shoe member, wherein the shoe member includes a body and a door that is pivotably connected to the body, wherein the body forms a fixed jaw of the clamp, and wherein the door forms a movable jaw of the clamp.

Paragraph B7. The truck rack of paragraph B6, wherein the shoe member forms a deck on which the foot is supported, and wherein the fixed jaw and the movable jaw are arranged along opposite edges of the deck.

Paragraph B8. The truck rack of any of paragraphs B1 to B7, wherein the base includes a shoe member including the clamp and forming a receiving area for the foot, and wherein the clamp is configured to capture the foot in the receiving area while urging the foot downward against a floor of the receiving area.

Paragraph B9. The truck rack of any of paragraphs B1 to B8, wherein the base has a deck on which the foot is supported, and wherein the clamp has a fixed jaw and a movable jaw arranged along opposite edges of the deck.

Paragraph B10. The truck rack of any of paragraphs B1 to B9, wherein at least one of the opposite edge regions of the foot has a sloped surface that engages a corresponding sloped surface of the base to urge the foot downward as the clamp is tightened against the opposite edge regions.

Paragraph B11. The truck rack of any of paragraphs B1 to B10, wherein the base includes a shoe member forming the clamp and a receiving area for the foot, and wherein the clamp is configured to capture the foot in the receiving area.

Paragraph B12. The truck rack of paragraph B11, wherein the receiving area includes a plurality of walls located around a deck, and wherein the plurality of walls are configured to limit horizontal movement of the foot before the clamp is tightened against the foot.

Paragraph B13. The truck rack of paragraph B12, wherein the deck is a recessed region of the receiving area.

Paragraph B14. The truck rack of any of paragraphs B11 to B13, wherein the receiving area substantially matches a shape of the foot at its horizontal perimeter.

Paragraph B15. The truck rack of any of paragraphs B11 to B14, wherein the receiving area includes an undercut wall region, and wherein one of the opposite edge regions of the foot is formed by a flange, and wherein the flange is configured to be received directly under the undercut wall region.

Paragraph B16. The truck rack of paragraph B15, wherein the flange is tapered in a plane orthogonal to a long axis of the foot.

Paragraph B17. The truck rack of any of paragraphs B1 to B16, wherein the clamp includes a clamp actuator having an interface for a driver to turn the actuator, further comprising a key-operated lock configured to cover the interface.

Paragraph B18. The truck rack of paragraph B17, wherein the driver interface includes a recess defined by a trailing end region of the clamp actuator.

Paragraph B19. The truck rack of any of paragraphs B1 to B18, wherein the foot is configured to prevent uncoupling of the base from the upper wall region of the truck bed while the foot is secured to the base with the clamp.

Paragraph B20. The truck rack of any of paragraphs B1 to B19, wherein the base includes a deck on which the foot is supported, and wherein the clamp includes a jaw that is pivotable with respect to the deck, to adjust the clamp between a tower-securing configuration and a tower-releasing configuration.

Paragraph B21. The truck rack of paragraph B20, wherein the base includes a clamp actuator that adjusts the clamp between the tower-securing configuration and the tower-releasing configuration.

Paragraph B22. The truck rack of paragraph B21, wherein the clamp actuator is configured to be rotated to adjust the clamp between the tower-securing configuration and the tower-releasing configuration.

Paragraph B23. The truck rack of any of paragraphs B1 to B22, wherein the base includes a deck on which the foot is supported, wherein the deck is elongated parallel to an axis, and wherein each jaw of the clamp is elongated substantially parallel to the axis.

Paragraph B24. The truck rack of paragraph B23, wherein the base is configured to be mounted on an upper wall region of the truck bed of a truck having a longitudinal axis, such that the deck is elongated substantially parallel to the longitudinal axis of the truck.

Paragraph B25. The truck rack of any of paragraphs B1 to B24, wherein the base includes a shoe member having a body and door pivotably connected to the body, and wherein the body forms a deck on which the foot is supported and a fixed jaw of the clamp.

Paragraph B26. The truck rack of any of paragraphs B1 to B25, wherein the shoe member has a receiving area for the foot, wherein the receiving area has a floor and a pair of opposing side walls to engage the opposite edge regions of the foot.

Paragraph B27. The truck rack of paragraph B26, wherein one of the opposing side walls forms a movable jaw of the clamp.

Paragraph B28. The truck rack of paragraph B27, wherein each side wall of the pair of opposing side walls has an undercut region to engage one of the opposite edge regions of the foot.

Paragraph B29. The truck rack of any of paragraphs B1 to B28, wherein the clamp has a pair of jaws, wherein a distance between the jaws is adjustable along a substantially horizontal axis, and wherein at least one of the opposite edge regions of the foot has a sloped surface that contacts a corresponding sloped surface of one of the jaws, such the clamp urges the foot downward when tightened against the foot.

Paragraph C1. A truck rack, comprising: (a) a tower having a foot and an upper end portion that is configured to support a crossbar; and (b) a base configured to mount the tower on an upper wall region of a truck bed, the base defining a receiving area for the foot and including a clamp configured to secure the foot in the receiving area while urging the foot downward against the base.

Paragraph C2. The truck rack of paragraph C1, wherein the receiving area includes a floor and a plurality of walls located above and extending along edges of the floor.

Paragraph C3. The truck rack of paragraph C1 or C2, wherein the clamp includes a pair of jaws, and wherein at least one of the jaws includes a sloped undercut configured to engage a sloped surface of the foot, to urge the foot downward against a floor of the receiving area as the jaws are tightened against the foot.

Paragraph D1. A truck rack, comprising: (a) a pair of towers, each tower having a lower end portion configured to be mounted on an upper wall region of a truck bed, and an upper end portion extendable upward in an inwardly sloped direction; and (b) a crossbar configured to be supported by and connected to the upper end portions of the pair of towers, such that the upper end portions are movable toward one another along the crossbar as such upper end portions are extended.

Paragraph D2. The truck rack of paragraph D1, wherein the upper end portions are connected to the crossbar with fasteners, wherein manipulating the fasteners adjusts the upper end portions between a fixed configuration in which each upper end portion is secured firmly to the crossbar and a slidable configuration in which each upper end portion is connected to, and slidable along, the crossbar as the upper end portions of the towers are extended.

Paragraph D3. The truck rack of paragraph D1 or D2, wherein the inwardly sloped direction is about 5 to 40 degrees from vertical.

Paragraph D4. The truck rack of paragraph D3, wherein the inwardly sloped direction is about 10 to 30 degrees from vertical.

Paragraph D5. The truck rack of any of paragraphs D1 to D4, wherein the inwardly sloped direction and the crossbar define a plane that is substantially orthogonal to a longitudinal axis of the truck.

Paragraph D6. The truck rack of any of paragraphs D1 to D5, wherein a height of each tower is continuously adjustable over a range of heights.

Paragraph D7. The truck rack of any of paragraphs D1 to D6, wherein each tower includes a telescoping intermediate portion.

Paragraph D8. The truck rack of paragraph D7, wherein the telescoping intermediate portion includes an outer tube and an inner tube that is slidably extendable from the outer tube.

Paragraph D9. The truck rack of paragraph D8, wherein the telescoping intermediate portion includes a fastener assembly partially located in a slot of the inner tube and being adjustable to fix the inner tube to the outer tube over a range of lengths of the telescoping intermediate portion.

Paragraph D10. The truck rack of paragraph D9, wherein the slot is a T slot.

Paragraph D11. The truck rack of paragraph D10, wherein the telescoping intermediate portion includes a bushing located at least partially inside an end portion of the outer tube and extending into the slot.

Paragraph D12. The truck rack of any of paragraphs D7 to D11, wherein the tower defines a longitudinal axis, and wherein the longitudinal axis is linear along the telescoping intermediate portion and curved along the upper end portion.

Paragraph D13. The truck rack of paragraph D12, wherein the telescoping intermediate portion and the upper end portion are attached to one another at a joint, and wherein the telescoping intermediate portion and the upper end portion are substantially flush with one another around the joint.

Paragraph D14. The truck rack of paragraph D13, wherein the telescoping intermediate portion and the upper end portion are attached to another via one or more fasteners at the joint.

Paragraph D15. The truck rack of any of paragraphs D12 to D14, wherein the upper end portion smoothly curves to substantially horizontal and forms a saddle for the crossbar.

Paragraph D16. The truck rack of any of paragraphs D1 to D15, wherein the telescoping intermediate portion includes height-indicating indicia.

Paragraph D17. The truck rack of any of paragraphs D1 to D16, wherein the crossbar includes position-indicating indicia arranged along opposite end portions of the crossbar to facilitate centering a longitudinal midpoint of the crossbar between the upper end portions of the towers.

Paragraph D18. The truck rack of paragraph D17, wherein substantially the same position-indicating indicia are arranged along each of the opposite end portions of the crossbar.

Paragraph D19. The truck rack of paragraph D18, wherein the position-indicating indicia include numbers.

Paragraph D20. The truck rack of any of paragraphs D1 to D19, further comprising a pair of bases configured to mount the lower end portions of the pair of towers to respective upper wall regions of the truck bed.

Paragraph E1. A truck rack, comprising: (a) a crossbar; and (b) a pair of towers each including a lower end portion configured to be mounted on an upper wall region of a truck bed, an upper end portion configured to support a crossbar, and a telescoping intermediate portion configured to extend upward with an inward slope and an adjustable length.

Paragraph E2. The truck rack of paragraph E1, wherein the inward slope is about 10 to 30 degrees from vertical.

Paragraph E3. The truck rack of paragraph E1 or E2, wherein the telescoping intermediate portion includes an outer tube and an inner tube that is slidably extendable from the outer tube.

Paragraph E4. The truck rack of paragraph E3, wherein the telescoping intermediate portion includes a fastener assembly partially located in a slot of the inner tube and being adjustable to fix the inner tube to the outer tube over a range of lengths of the telescoping intermediate portion.

Paragraph E5. The truck rack of paragraph E4, wherein the slot of the inner tube is a T slot.

Paragraph E6. The truck rack of paragraph E5, wherein the telescoping intermediate portion includes a bushing located at least partially inside an end portion of the outer tube and extending into the slot of the inner tube.

Paragraph E7. The truck rack of any of paragraphs E1 to E6, wherein the tower defines a longitudinal axis, and wherein the longitudinal axis is linear along the telescoping intermediate portion and curved along the upper end portion.

Paragraph E8. The truck rack of paragraph E7, wherein the telescoping intermediate portion and the upper end portion are attached to one another at a joint, and wherein the telescoping intermediate portion and the upper end portion are substantially flush with one another around the joint.

Paragraph E9. The truck rack of paragraph E8, wherein the telescoping intermediate portion and the upper end portion are attached to another via one or more fasteners at the joint.

Paragraph E10. The truck rack of any of paragraphs E7 to E9, wherein the upper end portion smoothly curves to generally horizontal and forms a saddle.

Paragraph E11. The truck rack of any of paragraphs E1 to E10, wherein the intermediate portion includes height-indicating indicia.

Paragraph E12. The truck rack of any of paragraphs E1 to E11, wherein the crossbar includes position-indicating indicia (centering indicia) arranged along opposite end portions of the crossbar to facilitate centering a longitudinal midpoint of the crossbar between the upper end portions of the towers.

Paragraph E13. The truck rack of paragraph E12, wherein substantially the same position-indicating indicia are arranged along each of the opposite end portions.

Paragraph E14. The truck rack of paragraph E12 or E13, wherein the position-indicating indicia include numbers.

Paragraph E15. The truck rack of any of paragraphs E1 to E14, further comprising a pair of bases configured to mount the lower end portions of the pair of towers to respective upper wall regions of the truck bed.

Paragraph F1. A truck rack, comprising: (a) a first crossbar assembly and a second crossbar assembly, each crossbar assembly being configured to be mounted on a pair of opposite upper wall regions of a truck bed and including a crossbar and a pair of towers; (b) a side rail configured to extend between corresponding towers of the first and second crossbar assemblies, the side rail having an adjustable length and including a slot; and (c) a rack accessory configured to be mounted to the side rail via the slot.

Paragraph F2. The truck rack of paragraph F1, wherein the side rail includes an outer tube and an inner tube that is adjustably extendable from the outer tube to adjust the length of the side rail.

Paragraph F3. The truck rack of paragraph F2, wherein the outer tube has the slot.

Paragraph F4. The truck rack of paragraph F3, wherein the slot is a T slot.

Paragraph F5. The truck rack of any of paragraphs F2 to F4, wherein the inner tube also has a slot, and wherein the length of the side rail is configured to be set by adjusting at least one fastener assembly that extends from the slot of the outer tube to the slot of the inner tube.

Paragraph F6. The truck rack of any of paragraphs F1 to F5, wherein the side rail includes a length-adjustable bar and a sleeve slidable along and fixable to the length-adjustable bar, and wherein the sleeve includes the slot.

Paragraph F7. The truck rack of paragraph F6, wherein respective bushings extend into the sleeve from opposite ends thereof.

Paragraph F8. The truck rack of any of paragraphs F1 to F7, wherein the side rail includes a bracket at each end for mounting the end to one of the corresponding towers.

Paragraph G1. A truck rack, comprising: (a) a crossbar; and (b) a pair of towers each including a lower end portion configured to be mounted on an upper wall region of a truck bed, an upper end portion configured to support a crossbar, and an intermediate portion extending between the lower and upper end portions; wherein the tower defines a longitudinal axis, and wherein the longitudinal axis is linear along the intermediate portion and curved along the upper end portion.

Paragraph G2. The truck rack of paragraph G1, wherein the intermediate portion and the upper end portion are attached to one another at a joint, and wherein the intermediate portion and the upper end portion are substantially flush with one another around the joint.

Paragraph G3. The truck rack of paragraph G2, wherein the intermediate portion and the upper end portion are attached to another via one or more fasteners at the joint.

Paragraph G4. The truck rack of any of paragraphs G1 to G3, wherein the upper end portion smoothly curves to substantially horizontal and forms a saddle for the crossbar.

The disclosure set forth above may encompass multiple distinct inventions with independent utility. Although each of these inventions has been disclosed in its preferred form(s), the specific examples thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Moreover, ordinal indicators, such as first, second, or third, for identified elements are used to distinguish between the elements, and do not indicate a particular position or order of such elements, unless otherwise specifically stated. Finally, the present disclosure incorporates material by reference. If any ambiguity or conflict in the meaning of a term results from this incorporation by reference, the literal contents of this application govern construction of the term.

We claim:

1. A truck rack, comprising:
    a crossbar; and
    a pair of towers, each tower including a lower end portion providing an elongated foot configured to be mounted on an upper wall region of a truck bed, an upper end portion configured to be connected to the crossbar, and
    a telescoping intermediate portion configured to extend upward with an inward slope and an adjustable length to change a height of the tower; and
    wherein:
        the telescoping intermediate portion has a bottom end welded to the elongated foot such that a longitudinal axis of the elongated foot is transverse to a longitudinal axis of the intermediate portion,
        the intermediate portion defines a first axial slot elongated along the longitudinal axis of the intermediate portion and a second axial slot elongated along the longitudinal axis of the intermediate portion,
        the intermediate portion includes an outer tube and an inner tube that slidably extends from the outer tube,
        the intermediate portion includes a first fastener assembly partially located in the first axial slot, extending from the outer tube to the inner tube, and being adjustable to fix the length of the intermediate portion,
        the intermediate portion includes a second fastener assembly partially located in the second axial slot, and
        each of the first fastener assembly and the second fastener assembly is adjustable to lock the outer tube to the inner tube such that the length of the intermediate portion is fixed.

2. The truck rack of claim 1, wherein the length of the intermediate portion is adjustable to, and fixable at, any length within a continuous range of lengths of the intermediate portion.

3. The truck rack of claim 1, wherein the first axial slot forms an axial channel and has a pair of longitudinal flanges extending along the axial channel.

4. A truck rack, comprising:
    a first crossbar assembly and a second crossbar assembly, each crossbar assembly being configured to be mounted on opposite, left and right upper wall regions of a truck bed and including a crossbar and a pair of towers; and
    a side rail defining a longitudinal axis and configured to be attached to, and extend between, corresponding towers of the first and second crossbar assemblies, the side rail having an adjustable length; and
    wherein the side rail includes an outer tube and an inner member that is extendable from the outer tube to adjust the length of the side rail, wherein the outer tube defines a first axial slot elongated along a longitudinal axis of the side rail, wherein the side rail also includes a sleeve through which the inner member extends, and wherein the sleeve defines a second axial slot.

5. The truck rack of claim 4, wherein each of the first axial slot and the second axial slot forms an axial channel and has a pair of longitudinal flanges extending along the axial channel.

6. The truck rack of claim 4, wherein the side rail includes a pair of brackets at opposite ends, wherein each tower has a lower section and an upper section that slidably extends from the lower section to adjust a height of the tower, and wherein each bracket is configured to be mounted to the lower section of one of the towers.

7. The truck rack of claim 4, further comprising a rack accessory configured to be mounted interchangeably to the side rail via each of the first axial slot and the second axial slot.

8. The truck rack of claim 4, wherein the sleeve is configured to be slidable along the inner member to a selected position and lockable to the inner member at the selected position.

9. The truck rack of claim 4, wherein the sleeve includes a tube member, and wherein the outer tube and the tube member of the sleeve are substantially identical to one another in cross-section.

10. A truck rack, comprising:
a crossbar; and
a pair of towers, each tower including a lower end portion configured to be mounted on an upper wall region of a truck bed, an upper end portion configured to be connected to the crossbar, and a telescoping intermediate portion configured to extend upward with an inward slope and an adjustable length to change a height of the tower; and
wherein:
the intermediate portion defines an axial slot elongated along a longitudinal axis of the intermediate portion,
the intermediate portion includes a fastener assembly partially located in the axial slot and being adjustable to fix the length of the intermediate portion,
the length of the intermediate portion is adjustable to, and fixable at, any length within a continuous range of lengths of the intermediate portion,
the intermediate portion includes an outer tube and an inner tube that is extendable from the outer tube to change the length of the intermediate portion,
the inner tube defines the axial slot,
the fastener assembly includes an externally threaded fastener disposed in threaded engagement with an internally-threaded fastener, and
the internally threaded fastener is located in the axial slot and the externally threaded fastener has a head located outside the outer tube.

11. The truck rack of claim 10, wherein the fastener assembly includes a pair of externally threaded fasteners disposed in threaded engagement with the same internally threaded fastener.

12. The truck rack of claim 10, wherein the axial slot is a first axial slot and the fastener assembly is a first fastener assembly, wherein the inner tube defines a second axial slot elongated along the longitudinal axis of the intermediate portion, wherein the intermediate portion includes a second fastener assembly partially located in the second axial slot, and wherein each of the first fastener assembly and the second fastener assembly is adjustable to lock the outer tube to the inner tube such that the length of the intermediate portion is fixed.

13. The truck rack of claim 12, wherein the first axial slot and the second axial slot are spaced from one another transverse to the longitudinal axis of the intermediate portion.

14. The truck rack of claim 12, wherein each fastener assembly includes a pair of externally threaded fasteners each having a head located outside the outer tube.

15. The truck rack of claim 10, wherein the intermediate portion includes a pair of externally threaded fasteners each extending into the axial slot and disposed in threaded engagement with an internally threaded fastener located in the axial slot, and wherein the pair of externally threaded fasteners are adjustable to fix the length of the intermediate portion.

* * * * *